(12) United States Patent
Akatsuka et al.

(10) Patent No.: US 12,420,784 B2
(45) Date of Patent: Sep. 23, 2025

(54) MOVING BODY CONTROL SYSTEM, MOVING BODY CONTROL METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Kosuke Akatsuka, Mishima (JP); Rio Suda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/449,343

(22) Filed: Aug. 14, 2023

(65) Prior Publication Data
US 2024/0067172 A1    Feb. 29, 2024

(30) Foreign Application Priority Data

Aug. 25, 2022    (JP) .................................. 2022-134240

(51) Int. Cl.
*B60W 30/095* (2012.01)
*B60W 50/14* (2020.01)

(52) U.S. Cl.
CPC ........ *B60W 30/0956* (2013.01); *B60W 50/14* (2013.01); *B60W 2050/146* (2013.01); *B60W 2554/4041* (2020.02); *B60W 2554/4045* (2020.02); *B60W 2554/4049* (2020.02)

(58) Field of Classification Search
CPC ....... B60W 30/0956; B60W 30/18163; B60W 50/14; B60W 2050/146; B60W 2554/4041; B60W 2554/4049; B60W 2554/4045; B60Q 2300/338
See application file for complete search history.

(56) References Cited

U.S. PATENT DOCUMENTS

| | | | |
|---|---|---|---|
| 11,215,982 B2 | 1/2022 | Urano et al. | |
| 11,325,618 B2 | 5/2022 | Umeda | |
| 2016/0129919 A1* | 5/2016 | Kubo | B60W 40/105 340/441 |
| 2017/0200197 A1* | 7/2017 | Brubaker | B60Q 1/2619 |

(Continued)

FOREIGN PATENT DOCUMENTS

| | | |
|---|---|---|
| DE | 10 2015 121 114 A1 | 6/2017 |
| JP | 2017-126193 A | 7/2017 |

(Continued)

*Primary Examiner* — Peter D Nolan
*Assistant Examiner* — Ce Li Li
(74) *Attorney, Agent, or Firm* — Sughrue Mion, PLLC

(57) ABSTRACT

A moving body control system determines, during execution of a remote operation of a moving body, whether a predetermined condition is satisfied based on driving environment information indicating the driving environment for the moving body. When the predetermined condition is satisfied, the moving body control system issues a notification to rearward of the moving body, the notification prompting to pass the moving body. Meanwhile, when the predetermined condition is not satisfied, the moving body control system prohibit issuance of the notification. The predetermined condition includes at least a first condition that "the moving body is in an environment where passing is legally permitted", and a second condition that "safety when the moving body is passed is ensured".

14 Claims, 19 Drawing Sheets

(56) References Cited

U.S. PATENT DOCUMENTS

| | | | |
|---|---|---|---|
| 2017/0301236 A1* | 10/2017 | Zydek | G08G 1/096741 |
| 2018/0354415 A1* | 12/2018 | Kamimae | E01H 5/066 |
| 2019/0126816 A1* | 5/2019 | Li | B60Q 1/46 |
| 2019/0137999 A1 | 5/2019 | Taguchi et al. | |
| 2019/0317491 A1* | 10/2019 | Kobayashi | G06V 20/56 |
| 2019/0339692 A1* | 11/2019 | Sakai | G05D 1/0027 |
| 2020/0189617 A1* | 6/2020 | Takada | G01C 21/34 |
| 2020/0209888 A1 | 7/2020 | Sakai et al. | |
| 2020/0326702 A1 | 10/2020 | Iwamoto et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2023/0132456 A1* | 5/2023 | Kojima | G06V 10/25 348/148 |

FOREIGN PATENT DOCUMENTS

| | | |
|---|---|---|
| JP | 2019-191982 A | 10/2019 |
| JP | 2020-9289 A | 1/2020 |

\* cited by examiner

200 DRIVING ENVIRONMENT INFORMATION

MOVING BODY CONTROL SYSTEM, MOVING BODY CONTROL METHOD, AND NON-TRANSITORY COMPUTER-READABLE RECORDING MEDIUM

CROSS-REFERENCE TO RELATED APPLICATION

The present application claims priority under 35 U.S.C. § 119 to Japanese Patent Application No. 2022-134240, filed Aug. 25, 2022, the contents of which application are incorporated herein by reference in their entirety.

BACKGROUND

Technical Field

The present disclosure relates to a technology for controlling a moving body. In particular, the present disclosure relates to a technology for issuing a notification prompting to pass a moving body to rearward of the moving body.

Background Art

JP 2017-126193 A discloses a vehicle that can be controlled remotely. While the vehicle is controlled remotely, the speed of the vehicle is limited to less than or equal to a predetermined value.

SUMMARY

A technology for issuing a notification prompting to pass (overtake) a moving body such as a vehicle to rearward of the moving body is considered. For example, since a speed of a moving body that is being operated remotely may be limited, it is considered that such a technology may be applied to the moving body that is being operated remotely. However, it is not always preferable to unconditionally issue the notification prompting to pass the moving body. For example, there may be inappropriate timings or situations for issuing the notification prompting to pass the moving body.

An object of the present disclosure is to provide a technique capable of appropriately issuing a notification prompting to pass a moving body to rearward of the moving body.

A first aspect relates to a moving body control system for controlling a moving body. The moving body control system includes one or more processors.

The one or more processors are configured to determine whether a predetermined condition is satisfied based on driving environment information indicating the driving environment for the moving body during execution of a remote operation of the moving body. When the predetermined condition is satisfied, the one or more processors issue a notification to rearward of the moving body, the notification prompting to pass the moving body. On the other hand, when the predetermined condition is not satisfied, the one or more processors prohibit the issuance of the notification.

The predetermined condition includes at least: a first condition that the moving body is in an environment where passing is legally permitted; and a second condition that safety when the moving body is passed is ensured.

A second aspect relates to a moving body control method for controlling a moving body. The moving body control method includes:

determining whether a predetermined condition is satisfied based on driving environment information indicating a driving environment for the moving body during execution of a remote operation of the moving body;

when the predetermined condition is satisfied, issuing a notification to rearward of the moving body, the notification prompting to pass the moving body; and when the predetermined condition is not satisfied, prohibiting issuance of the notification.

The predetermined condition includes at least: a first condition that the moving body is in an environment where passing is legally permitted; and a second condition that safety when the moving body is passed is ensured.

A third aspect relates to a moving body control program for controlling a moving body. The moving body control program, when executed by a computer, causes the computer to execute:

determining whether a predetermined condition is satisfied based on driving environment information indicating a driving environment for the moving body during execution of a remote operation of the moving body;

when the predetermined condition is satisfied, issuing a notification to rearward of the moving body, the notification prompting to pass the moving body; and when the predetermined condition is not satisfied, prohibiting issuance of the notification.

The predetermined condition includes at least: a first condition that the moving body is in an environment where passing is legally permitted; and a second condition that safety when the moving body is passed is ensured.

According to the present disclosure, during execution of the remote operation of the moving body, it is determined whether the predetermined condition is satisfied from at least the legal and safety perspectives. When the predetermined condition is satisfied, the notification prompting to pass the moving body is issued to rearward of the moving body. Accordingly, a smooth traffic flow is expected to be achieved. On the other hand, when the predetermined condition is not satisfied, the issuance of the notification is prohibited. That is, the notification that prompts passing is not issued at a timing that is unsuitable for passing from the legal and safety perspectives. This ensures safety of a following moving body. In addition, since an unnecessary notification is not issued, a processing load and power consumption are reduced.

DETAILED DESCRIPTION

An embodiment of the present disclosure will be described with reference to the accompanying drawings.

Control of a moving body is considered. Examples of the moving body include a vehicle and a robot. The vehicle may be either an autonomous driving vehicle or a vehicle driven by a driver. Examples of the robot include a logistics robot. In the following description, an example in which the moving body is a vehicle will be described. A "vehicle" in the following description shall be commonly replaced with a "moving body."

1. Overview of Vehicle Control System

Figure 1:
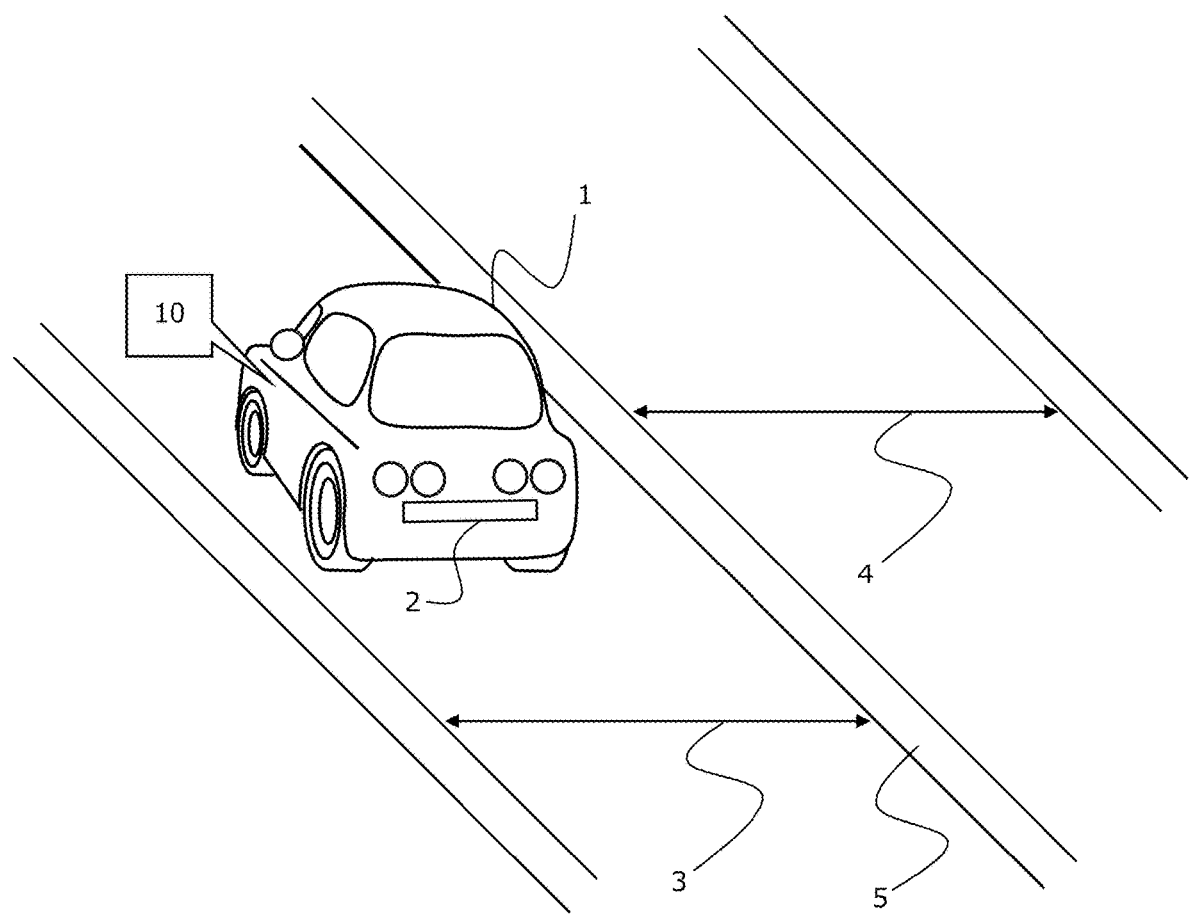
FIG. 1 is a conceptual view for illustrating an overview of a vehicle and a vehicle control system.

FIG. 1 is a conceptual view for illustrating an overview of a vehicle 1 and a vehicle control system 10 according to the present embodiment.

The vehicle 1 may be either a manual driving vehicle or an autonomous driving vehicle. The vehicle 1 may be operated remotely by a remote operator. The vehicle 1 has a display device 2 mounted thereon. In particular, at least one display device 2 is arranged on the rear part of the vehicle 1 so that the display device 2 is visible from behind the vehicle 1. A travel lane 3 is a lane in which the vehicle 1 is traveling. An oncoming lane 4 is a lane to allow for the travel of a vehicle that travels in a direction opposite to the traveling direction of the vehicle 1. The travel lane 3 and the oncoming lane 4 are separated by a center line 5.

The vehicle control system 10 controls the vehicle 1. Typically, the vehicle control system 10 is mounted on the vehicle 1. Alternatively, at least part of the vehicle control system 10 may be arranged in an external device outside the vehicle 1 to control the vehicle 1 remotely. That is, the vehicle control system 10 may be arranged in a dispersed manner in the vehicle 1 and in the external device.

The vehicle control system 10 controls the display device 2 mounted on the vehicle 1. More specifically, the vehicle control system 10 displays a variety of information on the display device 2 arranged on the rear part of the vehicle 1, thereby notifying a variety of information to rearward of the vehicle 1.

For example, the vehicle control system 10 displays on the display device 2 passing prompting information that prompts to pass (overtake) the vehicle 1. For example, the vehicle control system 10 displays a message "Go ahead" on the display device 2. As another example, the vehicle control system 10 may display on the display device 2 a sign or animation that prompts to pass the vehicle 1. Then, a driver of a following vehicle, which is traveling behind the vehicle 1 in the travel lane 3, is able to consider whether to pass the vehicle 1 by viewing the passing prompting information displayed on the display device 2 of the vehicle 1.

The vehicle control system 10 may prompt the driver of the following vehicle to pass the vehicle 1 without using the display device 2. For example, the vehicle control system 10 performs vehicle-to-vehicle communication (V2V communication) with the following vehicle to transmit the passing prompting information to the following vehicle. The following vehicle presents to its driver the passing prompting information received from the vehicle 1. For example, the passing prompting information is displayed on a display device provided in an instrument panel of the following vehicle. Thus, the driver of the following vehicle is able to consider whether to pass the vehicle 1 by viewing the presented passing prompting information.

In the following description, a "passing prompting notification" means a notification prompting to pass the vehicle 1. "Issuing the passing prompting notification to rearward of the vehicle 1" includes at least one of (1) displaying the passing prompting information on the display device 2 installed on the rear part of the vehicle 1, and (2) transmitting the passing prompting information to a following vehicle that travels behind the vehicle 1. The vehicle control system 10 can prompt the driver of the following vehicle to pass the vehicle 1 by issuing the passing prompting notification to rearward of the vehicle 1. Accordingly, a smooth traffic flow is expected to be achieved.

However, issuing a passing prompting notification unconditionally is not always preferable. There may be inappropriate timings or situations for issuing a passing prompting notification. For example, issuing a passing prompting notification is not appropriate when the type of the center line 5 of the road on which the vehicle 1 is traveling is the one that prohibits passing. As another example, issuing the passing prompting notification is not appropriate when there is an oncoming vehicle in the oncoming lane 4. Instead, issuing the passing prompting notification at an inappropriate timing may lead to a dangerous situation. In addition, issuing a passing prompting notification more than necessary may annoy the driver of the following vehicle.

From the foregoing perspectives, according to the present embodiment, a condition for determining an appropriate timing or situation for passing the vehicle 1 is determined in advance. The vehicle control system 10 determines whether or not the predetermined condition is satisfied. When the predetermined condition is satisfied, the vehicle control system 10 issues a passing prompting notification to rearward of the vehicle 1. Accordingly, a smooth traffic flow is expected to be achieved. On the other hand, when the predetermined condition is not satisfied, the vehicle control system 10 prohibits the issuance of the passing prompting notification. This ensures safety of the following vehicle. In addition, since an unnecessary notification is not issued, the processing load and power consumption of the vehicle control system 10 are reduced. Further, since an unnecessary notification is not issued, annoyance felt by the driver of the following vehicle is reduced.

The vehicle 1 may be operated remotely by a remote operator. A remote operation has a concept including both "remote driving" and "remote assistance." The speed of the vehicle 1 that is being operated remotely may be restricted by regulations and the like. That is, the vehicle 1 that is being operated remotely may travel at a speed lower than other vehicles. Accordingly, it is also preferable to issue the above-described passing prompting notification from the vehicle 1 that is being operated remotely to rearward of the vehicle 1.

Hereinafter, a vehicle control system according to the present embodiment will be described in further detail.

2. Example of Vehicle Control System 2-1. Examplary Configuration

Figure 2:
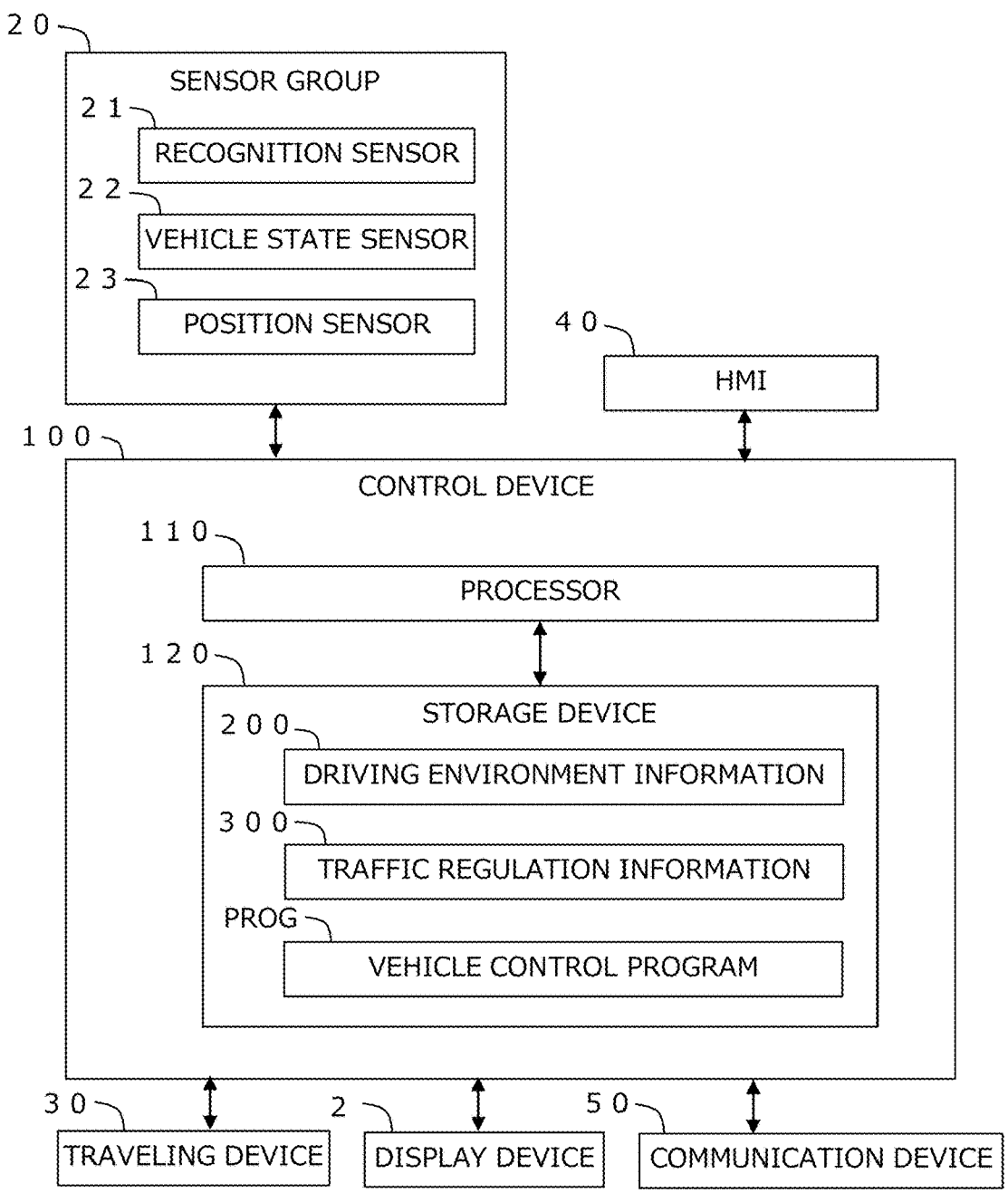
FIG. 2 is a block diagram illustrating an exemplary configuration of the vehicle control system.

FIG. 2 is a block diagram illustrating an exemplary configuration of the vehicle control system 10 according to the present embodiment. The vehicle control system 10 includes the display device 2, a sensor group 20, a traveling device 30, an HMI (Human Machine Interface) 40, a communication device 50, and a control device 100.

The display device 2 is arranged at least on the rear part of the vehicle 1. The display device 2 is configured to display a variety of information. Examples of the display device 2 include a display and an electronic signboard.

The sensor group 20 is mounted on the vehicle 1. The sensor group 20 includes a recognition sensor 21 that recognizes (or detects) a surrounding situation of the vehicle 1. Examples of the recognition sensor 21 include a camera, LIDAR (Laser Imaging Detection and Ranging), and a radar. The sensor group 20 also includes a vehicle state sensor 22 that detects the state of the vehicle 1. The vehicle state sensor 22 includes a speed sensor, an acceleration sensor, a yaw-rate sensor, a rudder angle sensor, and the like. Further, the sensor group 20 also includes a position sensor 23 that detects the position and orientation of the vehicle 1. Examples of the position sensor 23 include a GPS (Global Positioning System) sensor.

The traveling device 30 includes a steering device, a drive device, and a braking device. The steering device steers the wheels. For example, the steering device includes a power steering (or an EPS: Electric Power Steering) device. The drive device is a power source that generates a drive force. Examples of the drive device include an engine, an electric motor, and an in-wheel motor. The braking device generates a braking force.

The HMI 40 is an interface for providing a variety of information to an operator of the vehicle 1 and receiving various inputs from the operator of the vehicle 1. Examples of the HMI 40 include a touch panel, a display device, and a switch. The operator of the vehicle 1 may be either a driver of the vehicle 1, or a remote operator who operates the vehicle 1 remotely.

The communication device 50 communicates with a device outside the vehicle 1. For example, the communication device 50 communicates with an external management server. As another example, the communication device 50 may perform vehicle-to-vehicle communication (V2V communication) with a vehicle around the vehicle 1.

The control device 100 controls the vehicle 1. The control device 100 includes one or more processors 110 (hereinafter simply referred to as a processor 110), and one or more storage devices 120 (hereinafter simply referred to as a storage device 120). The processor 110 executes various processes. For example, the processor 110 includes a CPU (Central Processing Unit). Examples of the storage device 120 include a volatile memory, a nonvolatile memory, an HDD (Hard Disk Drive), and an SSD (Solid State Drive). The control device 100 may include one or more ECUs (Electronic Control Units). Part of the control device 100 may be an information processing device outside the vehicle 1. In such a case, part of the control device 100 communicates with the vehicle 1 to control the vehicle 1 remotely.

A vehicle control program PROG is a computer program for controlling the vehicle 1. A variety of processing by the control device 100 can be implemented by the processor 110 executing the vehicle control program PROG. The vehicle control program PROG is stored in the storage device 120. Alternatively, the vehicle control program PROG may be recorded on a non-transitory computer-readable recording medium.

The storage device 120 further has stored therein driving environment information 200 and traffic regulation information 300. The driving environment information 200 indicates the driving environment for the vehicle 1. Examples of the driving environment information 200 will be described later. The traffic regulation information 300 is information on the traffic regulations determined by a country in which the vehicle 1 is used. The traffic regulation information 300 differs depending on the country in which the vehicle 1 is used.

2-2. Driving Environment Information

Figure 3:
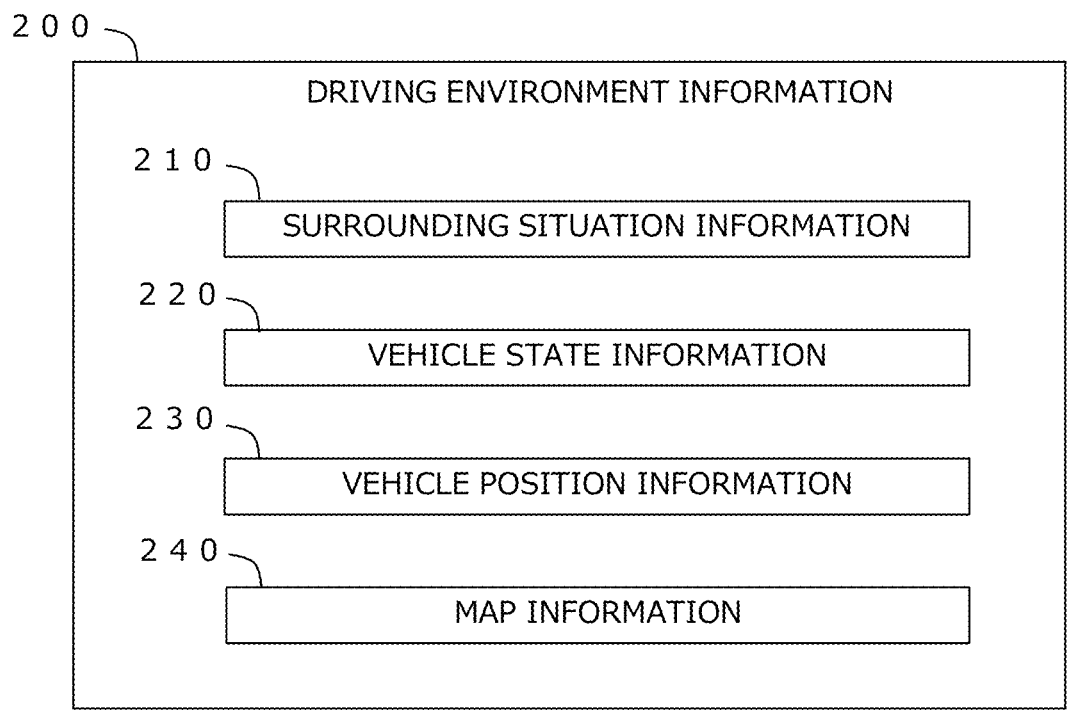
FIG. 3 is a block diagram illustrating an example of driving environment information.

FIG. 3 is a block diagram illustrating an example of the driving environment information 200. The driving environment information 200 includes surrounding situation information 210, vehicle state information 220, vehicle position information 230, and map information 240.

The surrounding situation information 210 is information indicating the surrounding situation of the vehicle 1. The control device 100 obtains the surrounding situation information 210 by recognizing the surrounding situation of the vehicle 1 using the recognition sensor 21. For example, the surrounding situation information 210 includes an image captured with a camera. Other examples of the surrounding situation information 210 include point group information obtained with LIDAR.

The surrounding situation information 210 further includes object information on an object around the vehicle 1. Examples of the object include pedestrians, bicycles, motorcycles, other vehicles (e.g., a preceding vehicle, a following vehicle, and a parked vehicle), traffic lights, road signs, and obstacles. The object information indicates the relative position and relative speed of the object with respect to the vehicle 1. For example, it is possible to identify an object and calculate the relative position of the object by analyzing image information obtained with a camera. It is also possible to identify an object and obtain the relative position and relative speed of the object based on the point group information obtained with LIDAR.

The vehicle state information 220 is information indicating the state of the vehicle 1. The control device 100 obtains the vehicle state information 220 from the vehicle state sensor 22. The vehicle state information 220 may indicate the driving state (autonomous driving state/manual driving state/remote operation state) of the vehicle 1.

The vehicle position information 230 is information indicating the current position of the vehicle 1. The control device 100 obtains the vehicle position information 230 from the result of detection of the position sensor 23. Alternatively, the control device 100 may obtain the vehicle position information 230 that is highly accurate through a well-known self-position estimation process (localization) using the object information and the map information 240.

The map information 240 includes a common navigation map. In addition, the map information 240 indicates the structure and arrangement of each lane. The map information 240 may have registered thereon the positions of landmarks, traffic lights, road signs, and construction sites, for example. The map information 240 may also have registered thereon the type of the center line 5. The map information 240 may also have registered thereon the effective range of each road sign. The map information 240 may also have registered thereon non-passing zones. The map information 240 may also have registered thereon the speed limit of each road.

2-3. Vehicle Travel Control

The control device 100 executes vehicle travel control for controlling the travel of the vehicle 1. The vehicle travel control includes steering control, acceleration control, and deceleration control. The control device 100 executes vehicle travel control by controlling the traveling device 30. Specifically, the control device 100 executes steering control by controlling the steering device. In addition, the control device 100 executes acceleration control by controlling the drive device. Further, the control device 100 executes deceleration control by controlling the braking device.

The control device 100 may also execute autonomous driving control based on the driving environment information 200. More specifically, the control device 100 generates a travel plan for the vehicle 1 based on the driving environment information 200. The travel plan includes a plan of maintaining the current driving lane, a plan of changing the lane, and a plan of getting around obstacles, for example. Further, the control device 100 generates a target trajectory that is necessary for the vehicle 1 to travel in accordance with the travel plan. The target trajectory includes a target position and target speed. Then, the control device 100 executes vehicle travel control to allow the vehicle 1 to follow the target route and target trajectory.

2-4. Notification Process

The control device 100 issues the "passing prompting notification" that prompts to pass the vehicle 1 to rearward of the vehicle 1. Such a process shall be hereinafter referred to as a "notification process". For example, the control device 100 displays on the display device 2 passing prompting information that prompts to pass the vehicle 1. As another example, the control device 100 may perform V2V communication with a following vehicle via the communication device 50 to transmit the passing prompting information to the following vehicle. Examples of the passing prompting information include a message "Go ahead", and a sign or animation that prompts another vehicle to pass the vehicle 1. In addition, the passing prompting information may include information indicating the current driving state (e.g., the autonomous driving state or the remote operation state) of the vehicle 1.

Hereinafter, examples of a notification process performed in various driving states will be described in detail.

3. Notification Process Performed in Autonomous Driving State

Figure 4:
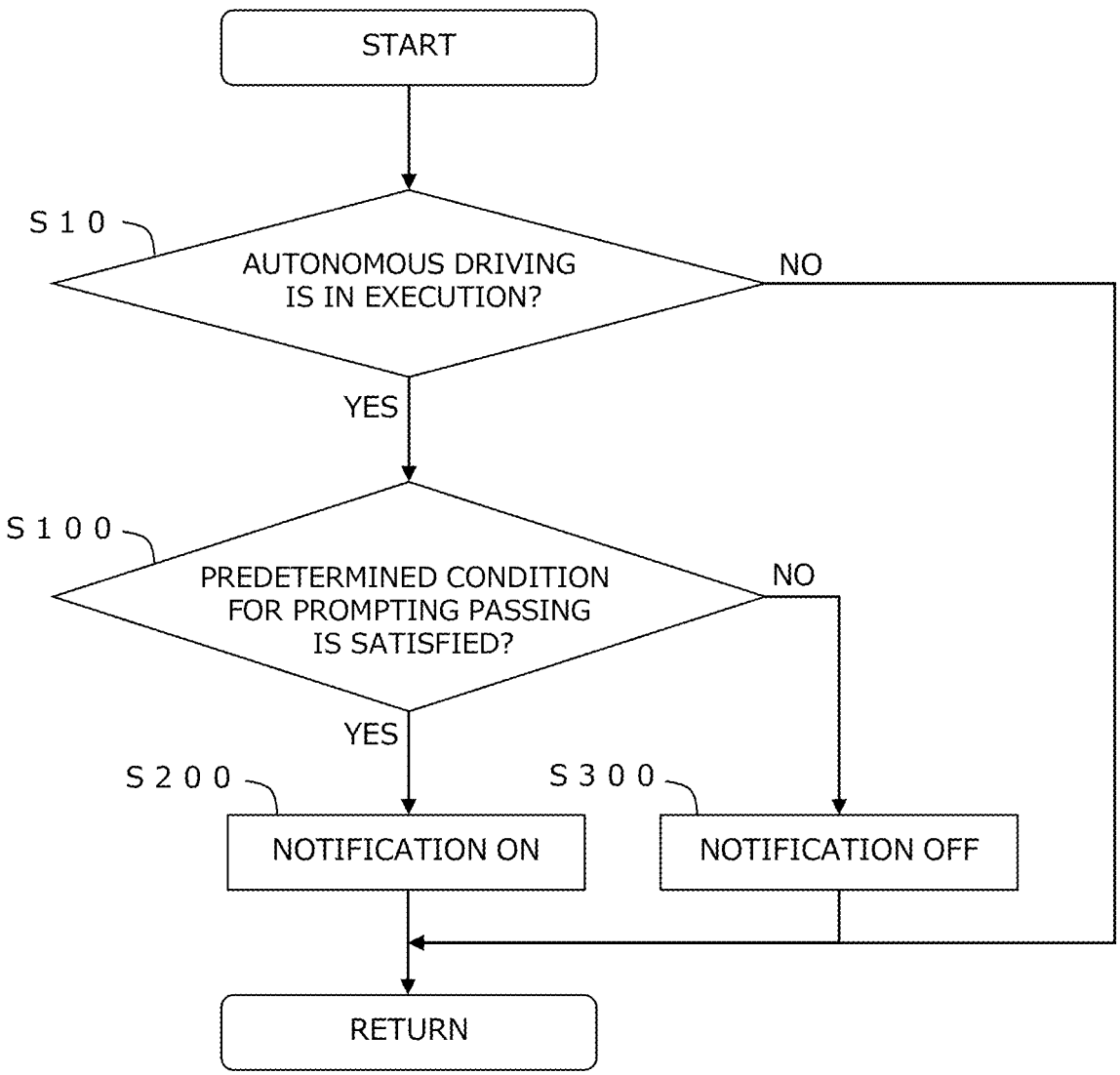
FIG. 4 is a flowchart illustrating a process related to a notification process performed in an autonomous driving state.

FIG. 4 is a flowchart illustrating a process related to the notification process performed in the autonomous driving state.

In Step S10, the control device 100 determines whether the autonomous driving of the vehicle 1 is in execution. When the autonomous driving of the vehicle 1 is in execution (Step S10: YES), the process proceeds to Step S100. Otherwise (Step S10: NO), the process returns to Step S10.

In Step S100, the control device 100 determines whether a predetermined condition for prompting passing is satisfied based on the driving environment information 200 indicating the driving environment for the vehicle 1. When the predetermined condition is satisfied (Step S100: YES), the process proceeds to Step S200. Meanwhile, when the predetermined condition is not satisfied (Step S100: NO), the process proceeds to Step S300.

In Step S200, the control device 100 issues the passing prompting notification to rearward of the vehicle 1 (notification ON). The passing prompting notification may include information indicating the current driving state (e.g., "the autonomous driving state") of the vehicle 1.

In Step S300, the control device 100 prohibit the issuance of the passing prompting notification (notification OFF).

Hereinafter, various examples of Step S100 will be described.

3-1. First Example of Step S100

Figure 5:
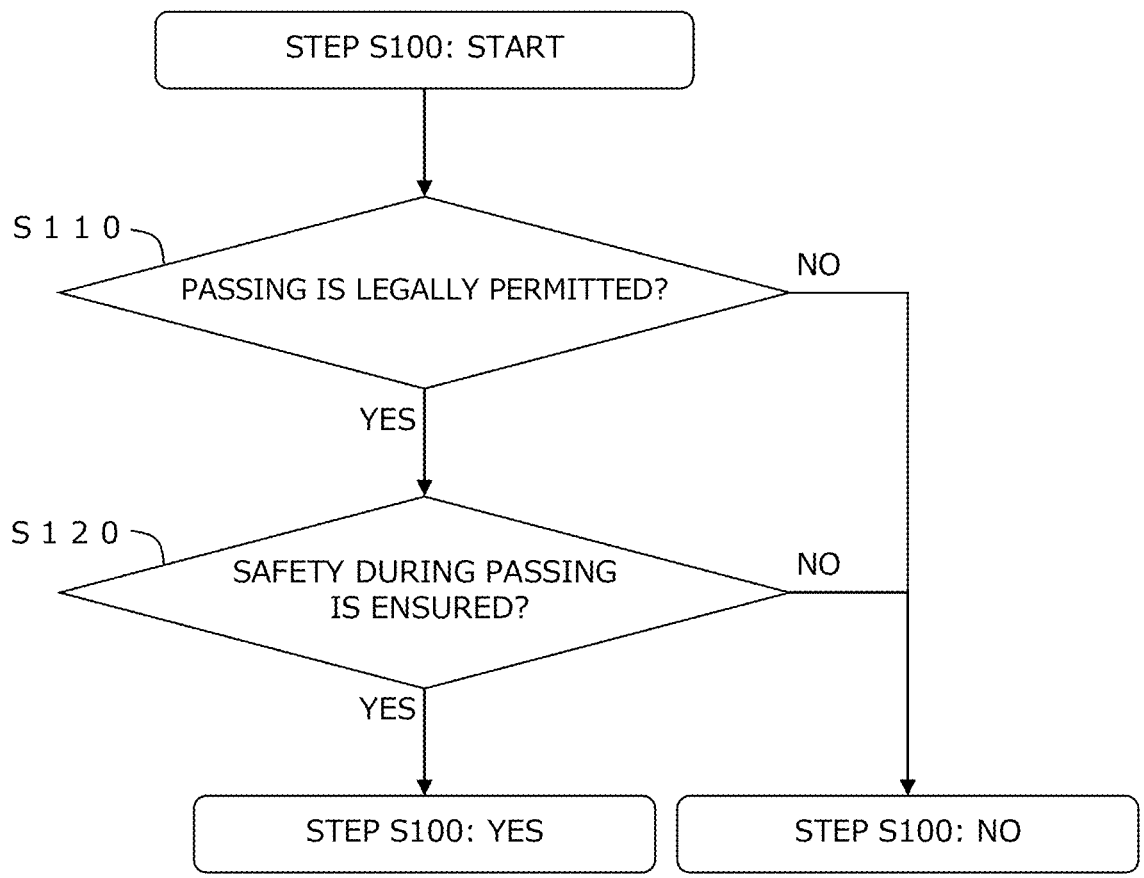
FIG. 5 is a flowchart illustrating a first example of Step S100.

FIG. 5 is a flowchart illustrating a first example of Step S100. In the first example, the predetermined condition for prompting passing includes a first condition that "the vehicle 1 is in an environment where passing is legally permitted", and a second condition that "the safety when the vehicle 1 is passed by a following vehicle is ensured".

For example, in Step S110, the control device 100 determines whether the first condition is satisfied, that is, whether the vehicle 1 is in an environment where passing is legally permitted. In Step S120, the control device 100 determines whether the second condition is satisfied, that is, whether the safety when the vehicle 1 is passed by a following vehicle is ensured. When both the first condition and the second condition are satisfied (Step S110: Yes, and Step S120: Yes), the predetermined condition is satisfied (Step S100: Yes). Meanwhile, when the first condition is not satisfied (Step S110: No) or when the second condition is not satisfied (Step S120: No), the predetermined condition is not satisfied (Step S100: No).

In this manner, whether the predetermined condition is satisfied is determined from at least the legal and safety perspectives during the execution of the autonomous driving of the vehicle 1. When the predetermined condition is satisfied, the passing prompting notification is issued to rearward of the vehicle 1. Accordingly, a smooth traffic flow is expected to be achieved even during the execution of the autonomous driving of the vehicle 1. Meanwhile, when the predetermined condition is not satisfied, the issuance of the passing prompting notification is prohibited. That is, a passing prompting notification is not issued at a timing that is unsuitable for passing from the legal and safety perspectives. This ensures the safety of the following vehicle. In addition, since an unnecessary notification is not issued, the processing load and power consumption are reduced. Further, annoyance felt by the driver of the following vehicle is reduced. In this manner, a passing prompting notification can be appropriately issued during the execution of the autonomous driving of the vehicle 1.

Hereinafter, specific examples of the first condition and the second condition included in the predetermined condition will be described.

3-1-1. Specific Example of First Condition

Figure 6:
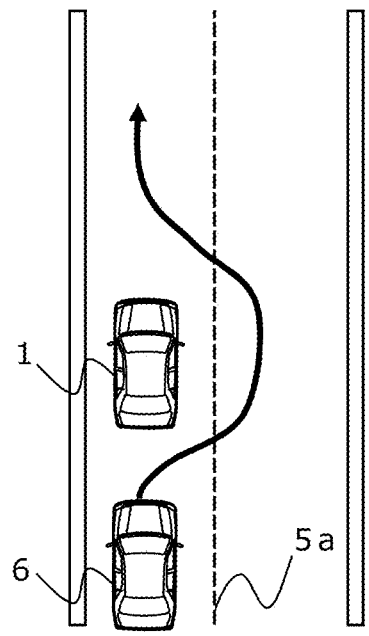
FIG. 6 is a conceptual view for illustrating an example of a first condition.
Figure 6:
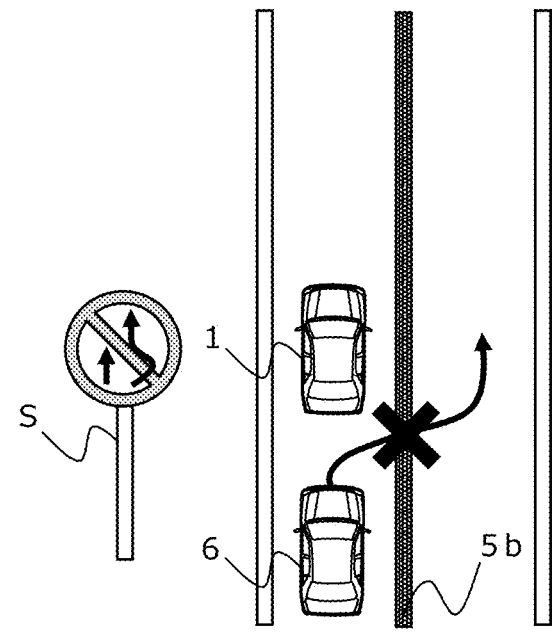

FIG. 6 is a conceptual view for illustrating an example of the first condition. The type and meaning of the center line 5 are specified by law in each country. The control device 100 determines whether the first condition is satisfied based on the type of the center line 5 of the road on which the vehicle 1 is traveling.

For example, in Japan, examples of the type of the center line 5 include a white solid line, a white dashed line, a yellow line, and a combination of a white dashed line and a yellow line. The white solid line means that straying from the travel lane 3 beyond the center line 5 is prohibited. The white dashed line means that straying from the travel lane 3 beyond the center line 5 is permitted. That is, the white dashed line means that passing a preceding vehicle at a position beyond the center line 5 is permitted. The yellow line means that passing a preceding vehicle at a position beyond the center line 5 is prohibited.

For example, as illustrated in FIG. 6, when the center line 5 is a white dashed line 5a, a following vehicle 6 is permitted to pass the vehicle 1. Meanwhile, when the center line 5 is a yellow line 5b, the vehicle 6 behind is prohibited from passing the vehicle 1.

The control device 100 obtains information on the type of the center line 5 of the road on which the vehicle 1 is currently traveling. For example, the map information 240 has registered thereon the type of the center line 5. The current position of the vehicle 1 is obtained from the vehicle position information 230. Accordingly, the control device 100 can obtain the type of the center line 5 at the current position based on the vehicle position information 230 and the map information 240.

As another example, the control device 100 may grasp the type of the center line 5 around the vehicle 1 using the recognition sensor 21. For example, the control device 100 can recognize the type of the center line 5 around the vehicle 1 by analyzing an image captured with a camera. In such a case, the surrounding situation information 210 (object information) indicates the type of the center line 5 around the vehicle 1. The control device 100 obtains from the surrounding situation information 210 information on the type of the center line 5 of the road on which the vehicle 1 is currently traveling.

The traffic regulation information 300 indicates the correspondence between the type and the meaning of the center line 5 determined by traffic regulations of a country in which the vehicle 1 is used. The control device 100 can grasp the meaning of the center line 5 of the road on which the vehicle 1 is traveling based on the traffic regulation information 300. That is, the control device 100 can determine whether the first condition is satisfied.

Instead of or in addition to the center line 5, a non-passing sign S may be used. For example, the map information 240 has registered thereon the position where the non-passing sign S is disposed as well as the effective range of the non-passing sign S. The control device 100 can determine whether the vehicle 1 is present in the effective range of the non-passing sign S based on the vehicle position information 230 and the map information 240. That is, the control device 100 can determine whether the first condition is satisfied.

From a common perspective, it can be said that the control device 100 determines whether the current position of the vehicle 1 is outside the non-passing zone determined by law. That is, the first condition includes a condition that "the current position of the vehicle 1 is outside the non-passing zone determined by law".

Figure 7:
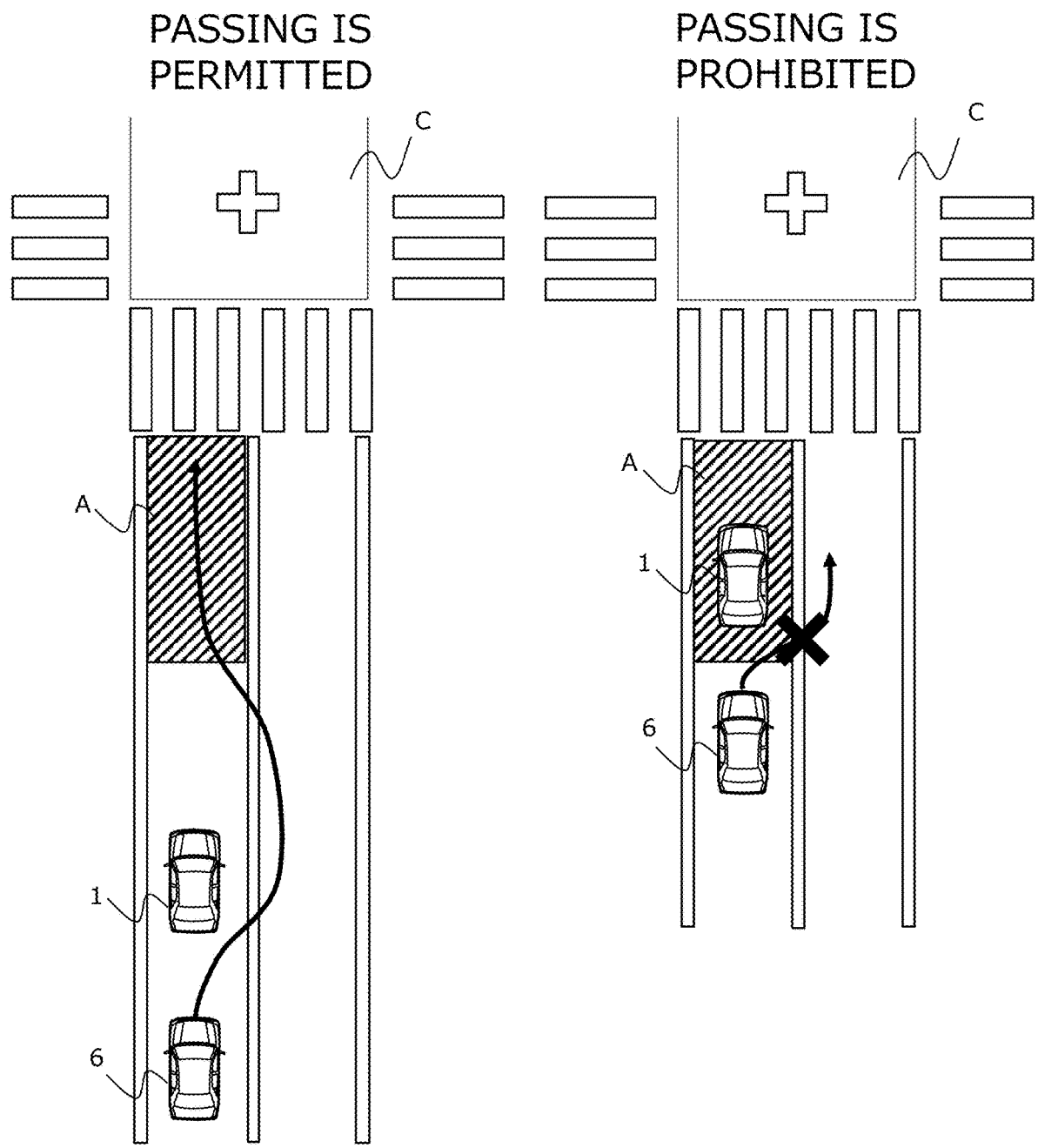
FIG. 7 is a conceptual view for illustrating another example of the first condition.

FIG. 7 is a conceptual view for illustrating another example of the non-passing zone. For example, in Japan, it is prohibited to pass a preceding vehicle at an intersection C as well as in a range A of 30 m ahead of the intersection C. That is, the intersection C as well as the range A of 30 m ahead of intersection C is a non-passing zone. Besides, railroad crossings, pedestrian crossings, bicycle crossing lanes, and a range of 30 m ahead of such regions are also non-passing zones.

For example, the map information 240 has non-passing zones registered thereon. The current position of the vehicle 1 is obtained from the vehicle position information 230. Accordingly, the control device 100 can determine whether the current position of the vehicle 1 is outside the non-passing zones based on the vehicle position information 230 and the map information 240.

As another example, the control device 100 may recognize an intersection, a railroad crossing, a pedestrian crossing, or a bicycle crossing lane ahead of the vehicle 1 using the recognition sensor 21. For example, the control device 100 may recognize an intersection, a railroad crossing, a pedestrian crossing, or a bicycle crossing lane ahead of the vehicle 1 by analyzing an image captured with a camera. In such a case, the surrounding circumstance information 210 (object information) indicates the relative distance between the vehicle 1 and the intersection, the railroad crossing, the pedestrian crossing, or the bicycle crossing lane. The traffic regulation information 300 indicates a length (e.g., 30 m) defining each non-passing zone. The control device 100 can determine whether the current position of the vehicle 1 is outside the non-passing zone based on the surrounding circumstance information 210 and the traffic regulation information 300.

When the current position of the vehicle 1 is outside the non-passing zone, the control device 100 determines that the first condition is satisfied (Step S110: YES). Meanwhile, when the current position of the vehicle 1 is in the non-passing zone, the control device 100 determines that the first condition is not satisfied (Step S110: NO).

3-1-2. Specific Example of Second Condition

Figure 8:
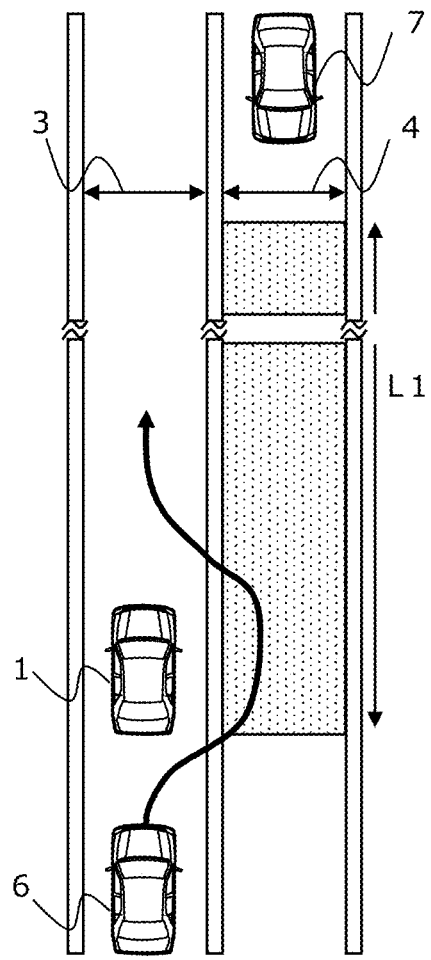
FIG. 8 is a conceptual view for illustrating an example of a second condition.
Figure 8:
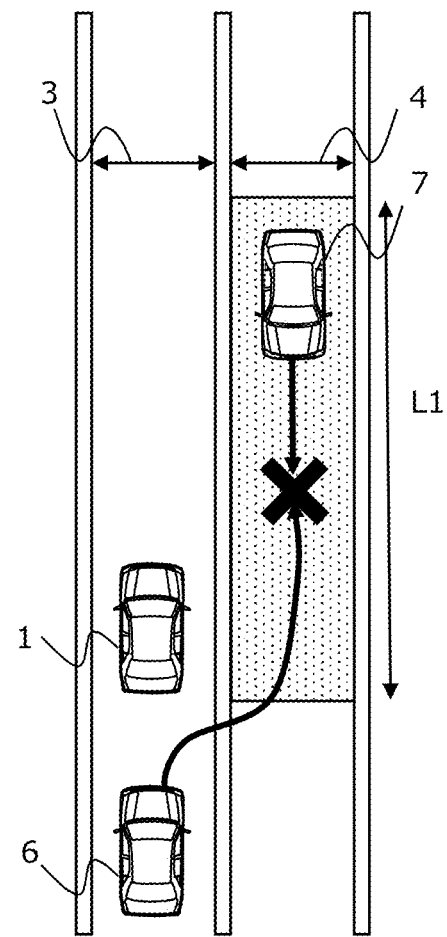

FIG. 8 is a conceptual view for illustrating an example of the second condition. For example, the second condition includes a condition that "there is no oncoming vehicle 7 in a first range L1 of the oncoming lane 4". The first range L1 is a range including a region on a side of the vehicle 1 to a region diagonally ahead of the vehicle 1. For example, the first range L1 is set to a given range.

As another example, the first range L1 may change depending on the speed of the vehicle 1. In such a case, the first range L1 is set larger as the speed of the vehicle 1 is higher. The speed of the vehicle 1 is obtained from the vehicle state information 220. The control device 100 variably sets the first range L1 based on the vehicle state information 220.

As further another example, the first range L1 may change depending on the relative speed between the vehicle 1 and the oncoming vehicle 7. In such a case, the first range L1 is set larger as the relative speed between the vehicle 1 and the oncoming vehicle 7 is higher. The relative speed between the vehicle 1 and the oncoming vehicle 7 is obtained from the surrounding situation information 210 (object information). The control device 100 variably sets the first range L1 based on the surrounding situation information 210.

The control device 100 determines whether there is an oncoming vehicle 7 in the first range L1. The relative position of the oncoming vehicle 7 seen from the vehicle 1 is obtained from the surrounding situation information 210 (object information). Accordingly, the control device 100 can determine whether there is an oncoming vehicle 7 in the first range L1 based on the surrounding situation information 210. When there is no oncoming vehicle 7 in the first range L1, the control device 100 determines that the safety when the vehicle 1 is passed is ensured. Meanwhile, when there is an oncoming vehicle 7 in the first range L1, the control device 100 determines that the safety when the vehicle 1 is passed is not ensured.

Figure 9:
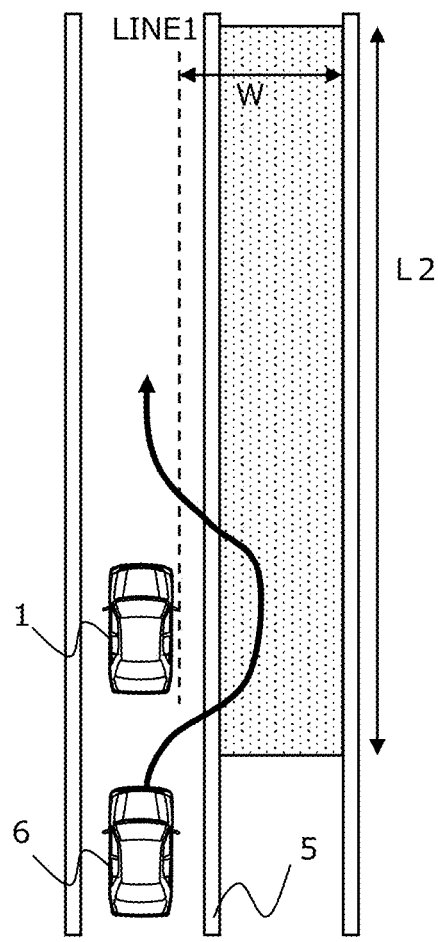
FIG. 9 is a conceptual view for illustrating another example of the second condition.
Figure 9:
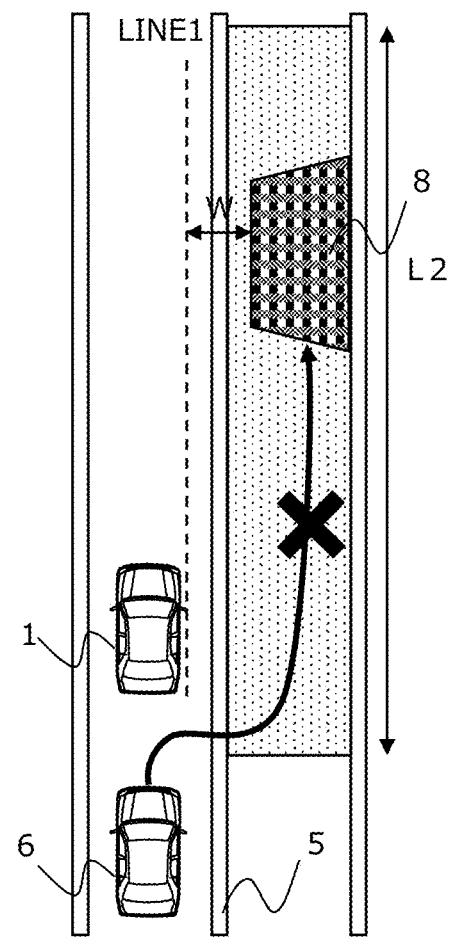

FIG. 9 is a conceptual view for illustrating another example of the second condition. The second condition may include that "a space for a following vehicle 6 to pass the vehicle 1 is secured". The control device 100 determines whether or not a space for the following vehicle 6 to pass the vehicle 1 is secured.

For example, a second range L2 illustrated in FIG. 9 is a given range of the oncoming lane 4 including a region on a side of the vehicle 1 to a region diagonally ahead of the vehicle 1. There may be an obstacle 8 in the second range L2. Examples of the obstacle 8 include a parked vehicle and a construction site. When there is no obstacle 8 in the second range L2, space that is enough for the following vehicle 6 to pass the vehicle 1 is secured, that is, the safety during passing is ensured. Meanwhile, when there is an obstacle 8 in the second range L2, space that is enough for the vehicle 6 behind to pass the vehicle 1 is not secured, that is, the safety during passing is not ensured.

From the foregoing perspectives, a "travelable-range width W" such as the one illustrated in FIG. 9 is used for the determination. The travelable-range width W is a width along the lane width direction that allows the following vehicle 6 to travel while passing the vehicle 1. More specifically, a LINE 1 is a line passing through a side of the vehicle 1 and parallel with the center line 5. The travelable-range width W is the shortest distance between the LINE 1 and the obstacle 8 in the second range L2. When there is no obstacle 8 in the second range L2, the travelable-range width W is the shortest distance between the LINE 1 and an end of the road on the side of the oncoming lane 4.

The control device 100 detects the obstacle 8 present in the second range L2 to calculate the travelable-range width W based on the surrounding situation information 210 (object information). Further, the control device 100 compares the travelable-range width W with a threshold. For example, the threshold is a value obtained by adding a predetermined margin to the width of a typical vehicle. As another example, the threshold may be a value obtained by adding a predetermined margin to the width of the following vehicle 6. The width of the following vehicle 6 can be estimated based on the surrounding situation information 210.

When the travelable-range width W is greater than or equal to the threshold, the control device 100 determines that space that is enough for the following vehicle 6 to pass the vehicle 1 is secured, that is, the safety during passing is ensured. Meanwhile, when the travelable-range width W is less than the threshold, the control device 100 determines that space that is enough for the vehicle 6 behind to pass the vehicle 1 is not secured, that is, the safety during passing is not ensured.

Figure 10:
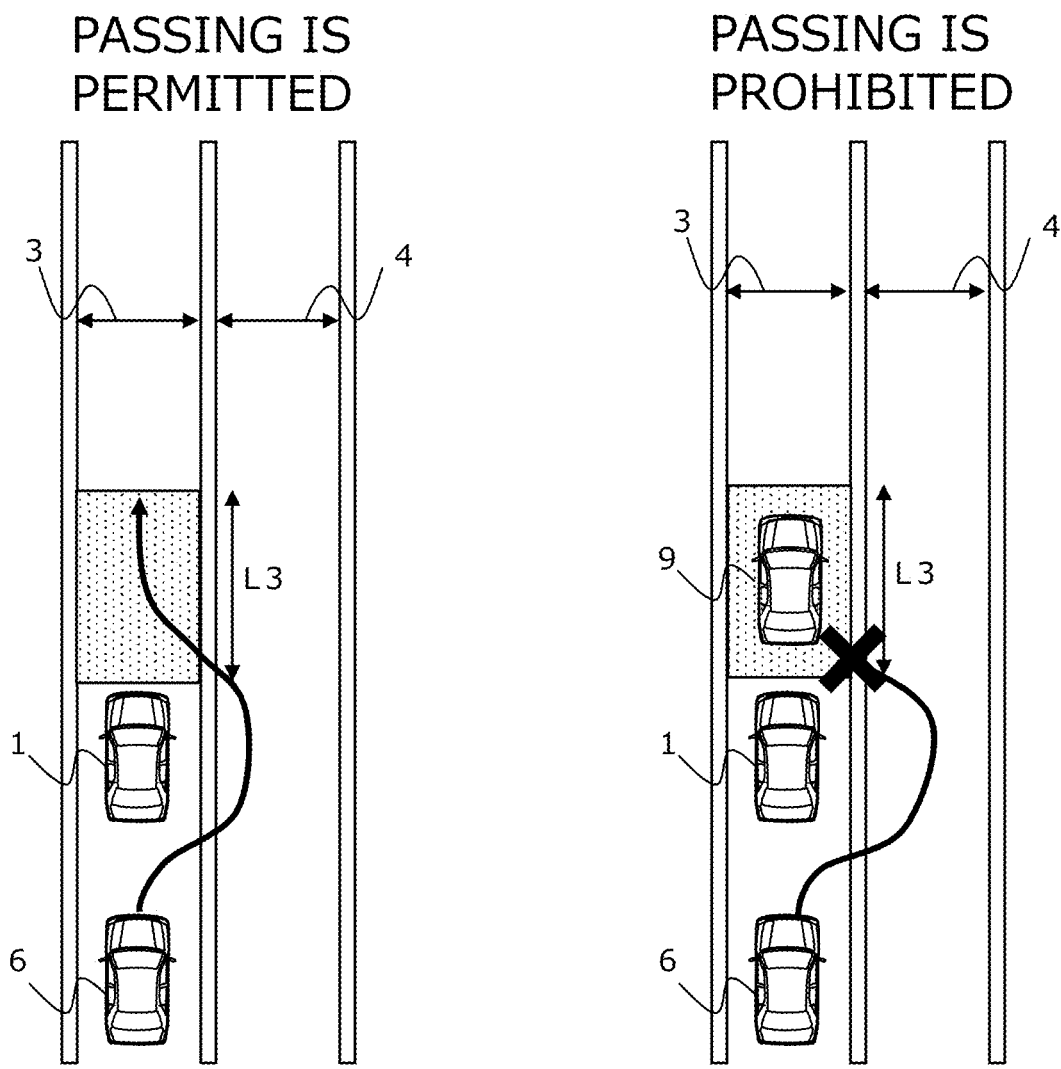
FIG. 10 is a conceptual view for illustrating further another example of the second condition.

FIG. 10 is a conceptual view for illustrating further another example of the second condition. When there is enough empty space ahead of the vehicle 1 in the travel lane 3, the following vehicle 6 that has passed the vehicle 1 is able to return to the travel lane 3. That is, space that is enough for the following vehicle 6 to pass the vehicle 1 is secured, and thus, the safety during passing is ensured. Meanwhile, when there is not enough empty space ahead of the vehicle 1 in the travel lane 3, the following vehicle 6 that has passed the vehicle 1 is unable to return to the travel lane 3. That is, space that is enough for the following vehicle 6 to pass the vehicle 1 is not secured, and thus, the safety during passing is not ensured.

From the foregoing perspectives, a "third range L3" such as the one illustrated in FIG. 10 may be used in addition to the travelable-range width W illustrated in FIG. 9. The third range L3 is a given range ahead of the vehicle 1. For example, the length of the third range L3 is a value obtained by adding a predetermined margin to the length of a typical vehicle.

The control device 100 determines whether there is a vehicle 9 ahead in the third range L3 based on the surrounding situation information 210 (object information). When there is no vehicle 9 ahead in the third range L3, the control device 100 determines that space that is enough for the following vehicle 6 to pass the vehicle 1 is secured, that is, the safety during passing is ensured. Meanwhile, when there is a vehicle 9 ahead in the third range L3, the control device 100 determines that space that is enough for the following vehicle 6 to pass the vehicle 1 is not secured, that is, the safety during passing is not ensured.

The second condition may include both the condition that "there is no oncoming vehicle 7 in the first range L1 of the oncoming lane 4" (see FIG. 8) and the condition that "the space for the following vehicle 6 to pass the vehicle 1 is secured" (see FIGS. 9 and 10). When both the conditions are satisfied, the control device 100 determines that the second condition is satisfied (Step S120: YES). Meanwhile, when at least one of the conditions is not satisfied, the control device 100 determines that the second condition is not satisfied (Step S120: NO). 3-2. Second Example of Step S100

Figure 11:
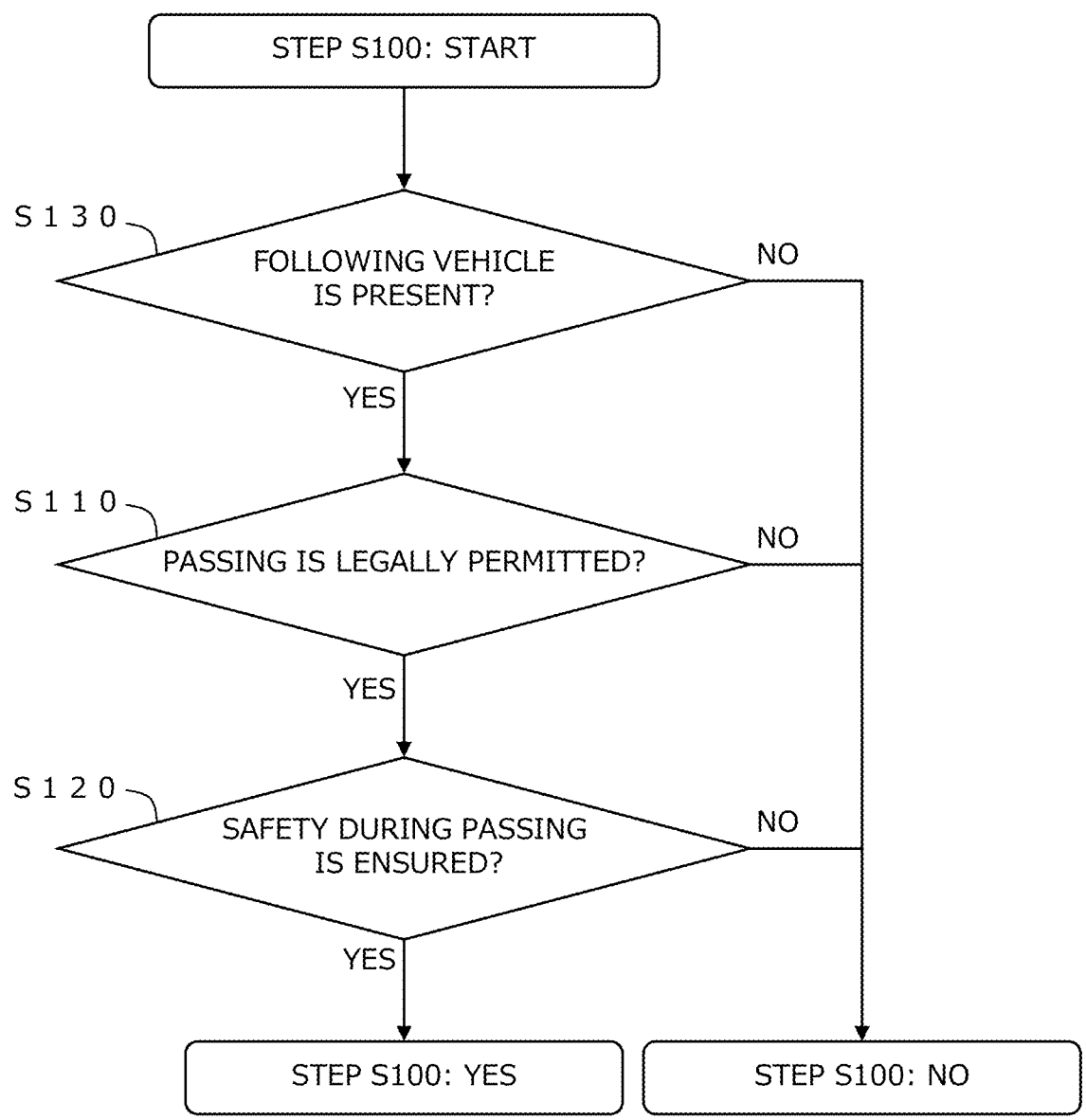
FIG. 11 is a flowchart illustrating a second example of Step S100.

FIG. 11 is a flowchart illustrating a second example of Step S100. In comparison with the foregoing first example, Step S130 is further added.

In Step S130, the control device 100 determines whether a following vehicle 6 is present within a given range behind the vehicle 1. When a following vehicle 6 is present within a given range behind the vehicle 1 (Step S130: YES), the process proceeds to Step S110. Meanwhile, when there is no following vehicle 6 within a given range behind the vehicle 1 (Step S130: NO), the predetermined condition for prompting passing is not satisfied (Step S100: No). That is, the predetermined condition for prompting passing further includes a third condition that "a following vehicle 6 is present within a given range behind the vehicle 1".

Figure 12:
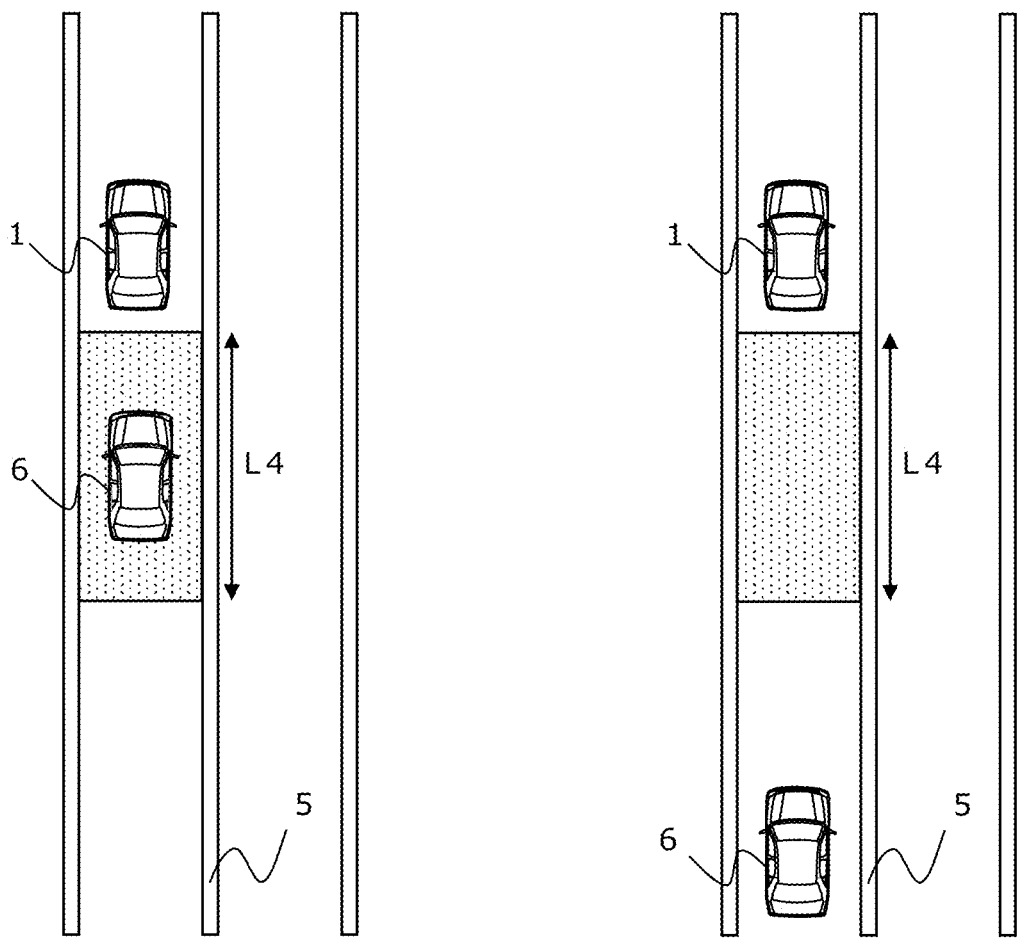
FIG. 12 is a conceptual view for illustrating a third condition.

FIG. 12 is a conceptual view for illustrating the third condition. The control device 100 sets a fourth range L4 in the region behind the vehicle 1 in the travel lane 3. The length of the fourth range L4 is several tens of meters, for example. The control device 100 determines whether there is a following vehicle 6 in the fourth range L4 based on the surrounding situation information 210 (object information). When there is a following vehicle 6 in the fourth range L4, the control device 100 determines that the third condition is satisfied (Step S130: YES). Meanwhile, when there is no following vehicle 6 in the fourth range L4, the control device 100 determines that the third condition is not satisfied (Step S130: NO).

As described above, according to the second example, when there is no following vehicle 6 behind the vehicle 1, a passing prompting notification is not issued. That is, the issuance of the passing prompting notification more than necessary is avoided. Thus, the processing load and power consumption are reduced.

3-3. Third Example of Step S100

Figure 13:
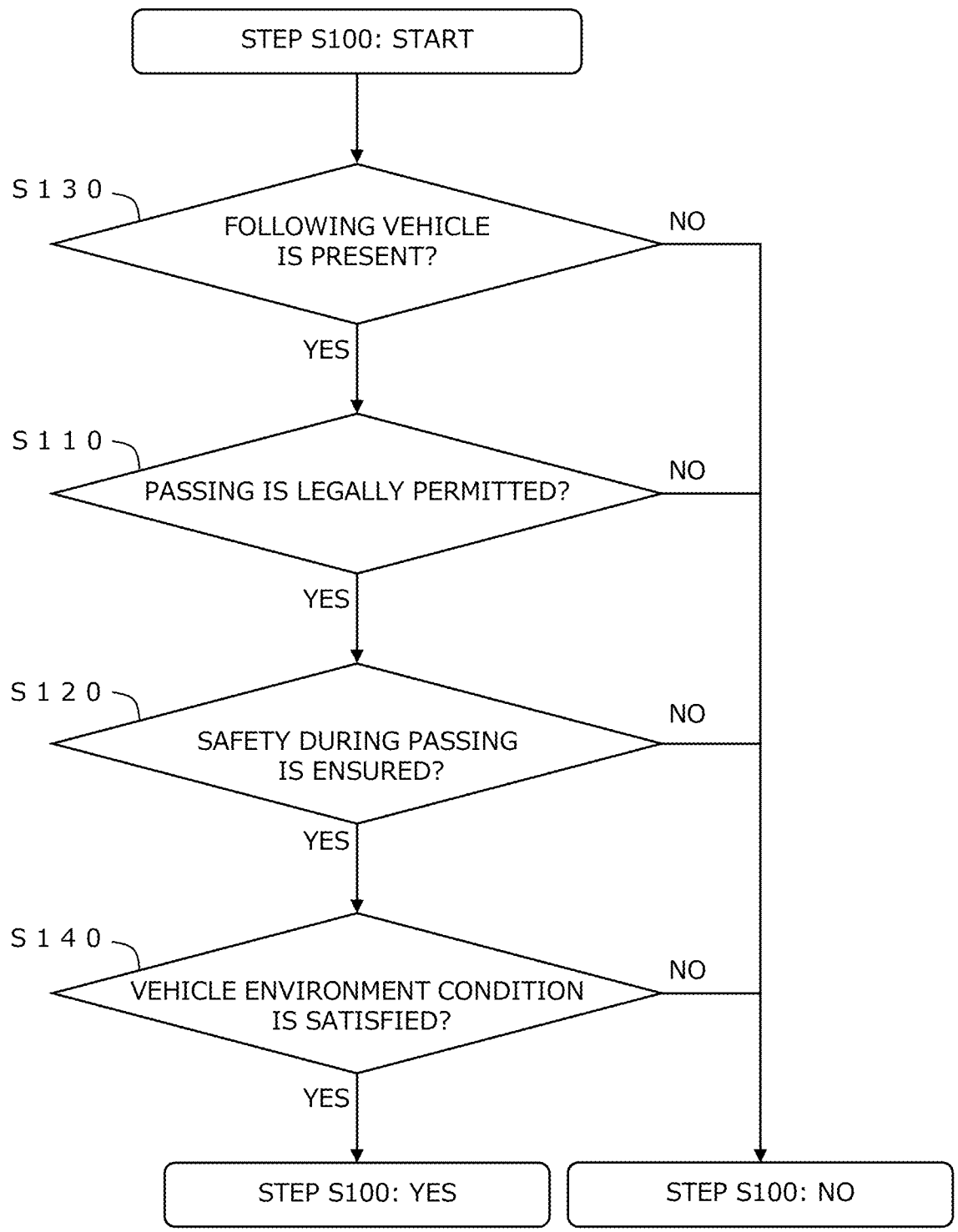
FIG. 13 is a flowchart illustrating a third example of Step S100.

FIG. 13 is a flowchart illustrating a third example of Step S100. In comparison with the foregoing second example, Step S140 is further added.

In Step S140, the control device 100 determines whether a vehicle environment condition is satisfied. When the vehicle environment condition is not satisfied (Step S140: No), the predetermined condition for prompting passing is not satisfied (Step S100: No). That is, the predetermined condition for prompting passing further includes the vehicle environment condition. The vehicle environment condition is determined based on a flag exemplarily illustrated below.

A flag 1 relates to a relative distance between the vehicle 1 and the following vehicle 6. The relative distance between the vehicle 1 and the following vehicle 6 is obtained from the surrounding situation information 210. The control device 100 determines whether a state in which the relative distance is less than or equal to a threshold continues for a given period of time based on the surrounding situation information 210. When the state in which the relative distance is less than or equal to the threshold continues for a given period of time, the control device 100 sets the flag 1 ON.

A flag 2 relates to a relative speed between the vehicle 1 and the following vehicle 6. The relative speed between the vehicle 1 and the following vehicle 6 is obtained from the surrounding situation information 210. The control device 100 monitors the relative speed between the vehicle 1 and the following vehicle 6 based on the surrounding situation information 210. When the relative speed has changed from a value that is greater than or equal to a threshold to a value that is less than the threshold, the control device 100 determines that the following vehicle 6 has caught up with the vehicle 1 and thus has decelerated, and then sets the flag 2 ON.

A flag 3 relates to the speed of the vehicle 1 with respect to the speed limit. The map information 240 has registered thereon the speed limit of each road. The speed limit at the position where the vehicle 1 is traveling is obtained based on the vehicle position information 230 and the map information 240. A speed threshold is a value that is less than the speed limit. For example, the speed threshold is obtained by multiplying the speed limit by a constant that is less than 1. The speed of the vehicle 1 is obtained from the vehicle state information 220. The control device 100 determines whether a state in which the speed of the vehicle 1 is less than or equal to the speed threshold continues for a given period of time based on the vehicle state information 220, the vehicle position information 230, and the map information 240. When the state in which the speed of the vehicle 1 is less than or equal to the speed threshold continues for a given period of time, the control device 100 sets the flag 3 ON.

A flag 4 relates to whether the vehicle 1 is stopping on the shoulder of a road. The control device 100 determines whether the vehicle 1 is stopping on the shoulder of a road based on the vehicle state information 220, the vehicle position information 230, and the map information 240. Alternatively, the control device 100 determines whether the vehicle 1 is stopping on the shoulder of a road based on the surrounding situation information 210. When the vehicle 1 is stopping on the shoulder of a road, the control device 100 sets the flag 4 ON.

For example, when one of the flag 1 and the flag 2 is set ON, the control device 100 determines that the vehicle environment condition is satisfied. As another example, when one of the flag 3 and the flag 4 is set ON, the control device 100 may determine that the vehicle environment condition is satisfied. As further another example, when one of the flag 1 and the flag 2 is set ON and one of the flag 3 and the flag 4 is set ON, the control device 100 may determine that the vehicle environment condition is satisfied.

According to the third example, the predetermined condition for prompting passing is defined more precisely. Thus, a passing prompting notification can be issued more appropriately.

4. Notification Process Performed in Remote Operation State

Figure 14:
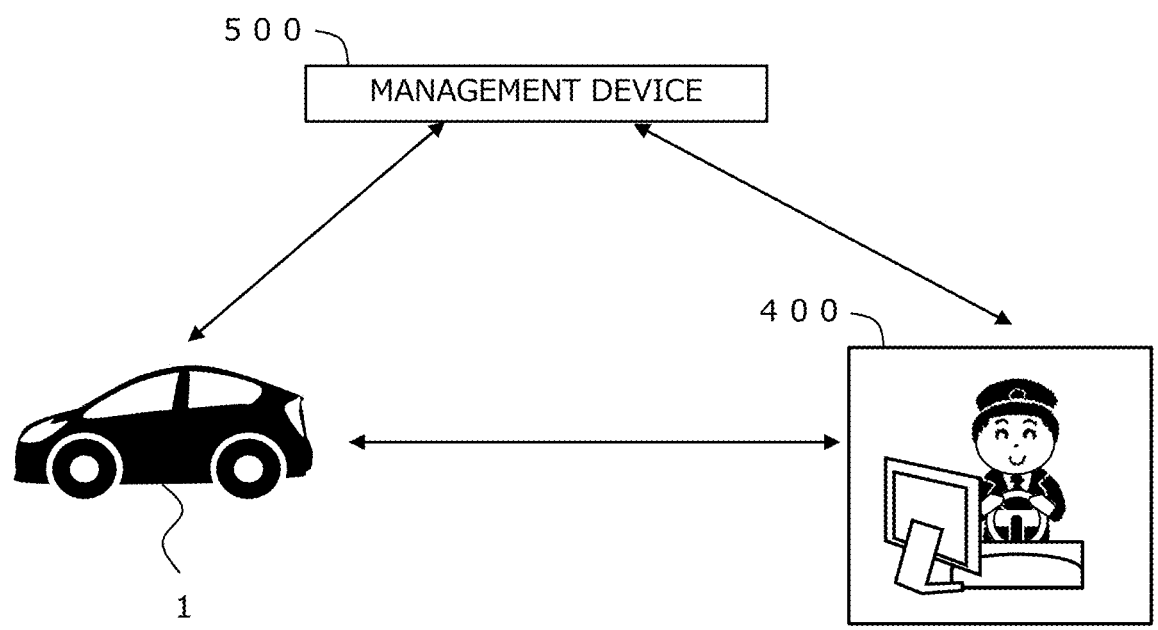
FIG. 14 is a conceptual view for illustrating an overview of a remote operation system.

FIG. 14 is a conceptual view for illustrating an overview of a remote operation system 60. The remote operation system 60 includes the vehicle 1 (the vehicle control system 10), a remote operator terminal 400, and a management device 500. The remote operator terminal 400 is a terminal device used for a remote operator to operate the vehicle 1 remotely. The management device 500 manages the remote operation system 60. Typically, the management device 500 is a cloud management server. The vehicle 1 (the vehicle control system 10), the remote operator terminal 400, and the management device 500 can communicate with one another via a communication network.

Vehicle information is information obtained by the sensor group 20 mounted on the vehicle 1. The vehicle information includes at least an image captured with a camera mounted on the vehicle 1. The vehicle information may include at least part of the driving environment information 200 (the surrounding situation information 210, the vehicle state information 220, and the vehicle position information 230). The vehicle 1 (the vehicle control system 10) transmits the vehicle information to the remote operator terminal 400 either directly or via the management device 500.

The remote operator terminal 400 receives the vehicle information transmitted from the vehicle 1. The remote operator terminal 400 presents the vehicle information to the remote operator. Specifically, the remote operator terminal 400 includes a display device so that an image and the like are displayed on the display device. The remote operator recognizes the surrounding situation of the vehicle 1 by viewing the displayed information, and operates the vehicle 1 remotely. Remote operation information is information related to a remote operation performed by the remote operator. The remote operator terminal 400 transmits the remote operation information to the vehicle 1 (the vehicle control system 10) either directly or via the management device 500.

The vehicle 1 (the vehicle control system 10) receives the remote operation information transmitted from the remote operator terminal 400. The vehicle control system 10 performs vehicle travel control in accordance with the received remote operation information. In this manner, the remote operation of the vehicle 1 is implemented.

The speed of the vehicle 1 that is being operated remotely may be restricted by regulations and the like. That is, the vehicle 1 that is being operated remotely may travel at a speed lower than other vehicles. Accordingly, it is also preferable to issue the above-described passing prompting notification from the vehicle 1 that is being operated remotely to rearward of the vehicle 1.

Figure 15:
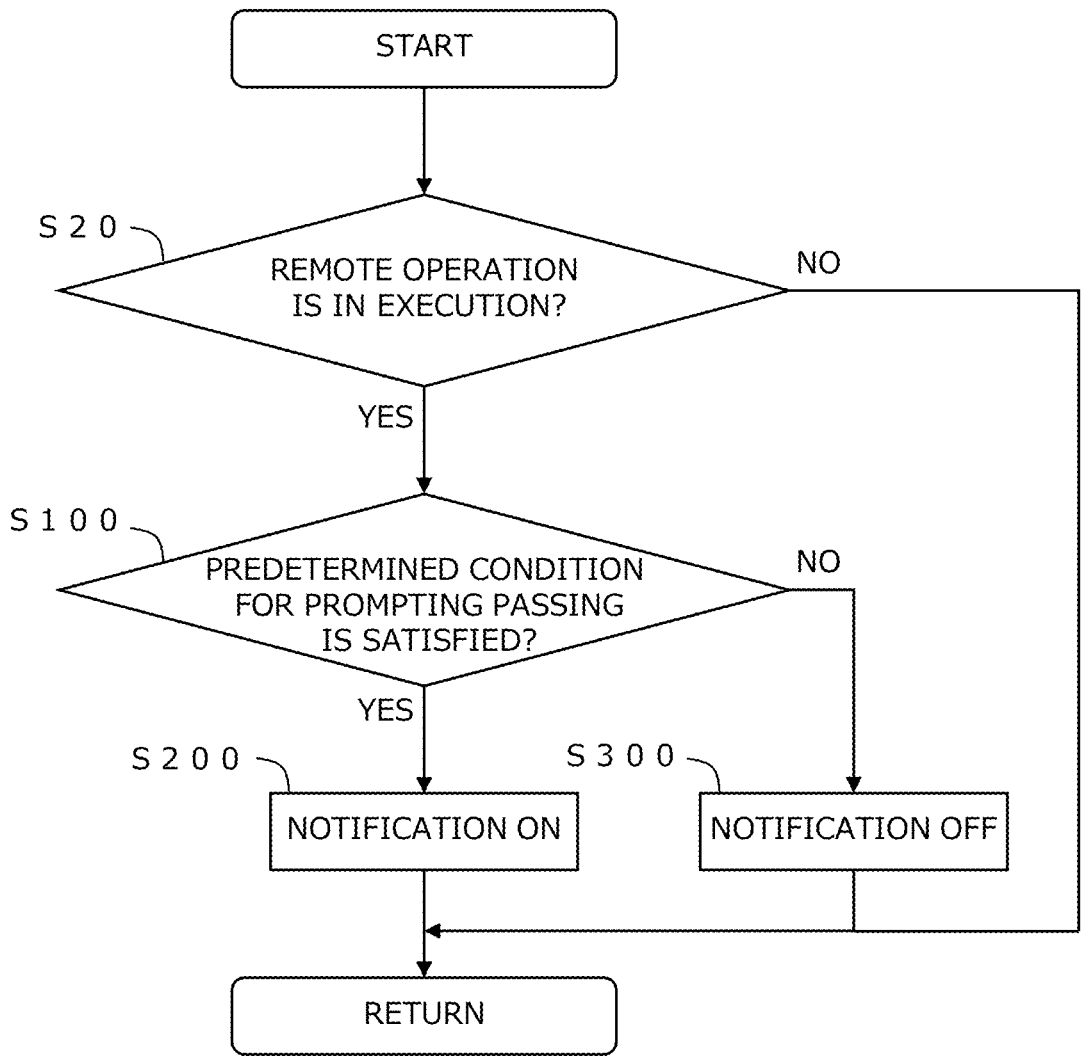
FIG. 15 is a flowchart illustrating a process related to a notification process performed in a remote operation state.

FIG. 15 is a flowchart illustrating a process related to the notification process performed in the remote operation state.

In Step S20, the control device 100 determines whether a remote operation of the vehicle 1 is in execution. When a remote operation of the vehicle 1 is in execution (Step S20: YES), the process proceeds to Step S100. Otherwise (Step S20: NO), the process returns to Step S20.

In Step S100, the control device 100 determines whether the predetermined condition for prompting passing is satisfied based on the driving environment information 200 indicating the driving environment for the vehicle 1. Step S100 is similar to that described in Section 3 above. Thus, the detailed description thereof is omitted. When the predetermined condition is satisfied (Step S100: YES), the process proceeds to Step S200. Meanwhile, when the predetermined condition is not satisfied (Step S100: NO), the process proceeds to Step S300.

In Step S200, the control device 100 issues a passing prompting notification to rearward of the vehicle 1 (notification ON). The passing prompting notification may include information indicating the current driving state (e.g., "the remote operation state") of the vehicle 1.

In Step S300, the control device 100 prohibit issuance of the passing prompting notification (notification OFF).

As described above, during the execution of the remote operation of the vehicle 1, it is determined whether the predetermined condition is satisfied from at least the legal and safety perspectives. When the predetermined condition is satisfied, the passing prompting notification is issued to rearward of the vehicle 1. Accordingly, a smooth traffic flow is expected to be achieved even during the execution of the remote operation. On the other hand, when the predetermined condition is not satisfied, the issuance of the passing prompting notification is prohibited. That is, the passing prompting notification is not issued at a timing that is unsuitable for passing from the legal and safety perspectives. This ensures the safety of the following vehicle. In addition, since an unnecessary notification is not issued, the processing load and power consumption are reduced. Further, annoyance felt by the driver of the following vehicle is reduced. In this manner, a passing prompting notification can be appropriately issued during the execution of a remote operation of the vehicle 1.

5. When Notification is Requested by Operator

The operator of the vehicle 1 may request the control device 100 to issue a passing prompting notification. For example, the operator of the vehicle 1 is the driver of the vehicle 1. In such a case, the driver inputs a notification request using the HMI 40 mounted on the vehicle 1. As another example, the operator of the vehicle 1 during a remote operation is a remote operator. The remote operator inputs a notification request using the HMI 40 provided on the remote operator terminal 400. The notification request inputted by the remote operator is transmitted from the remote operator terminal 400 to the vehicle 1 (the vehicle control system 10).

Figure 16:
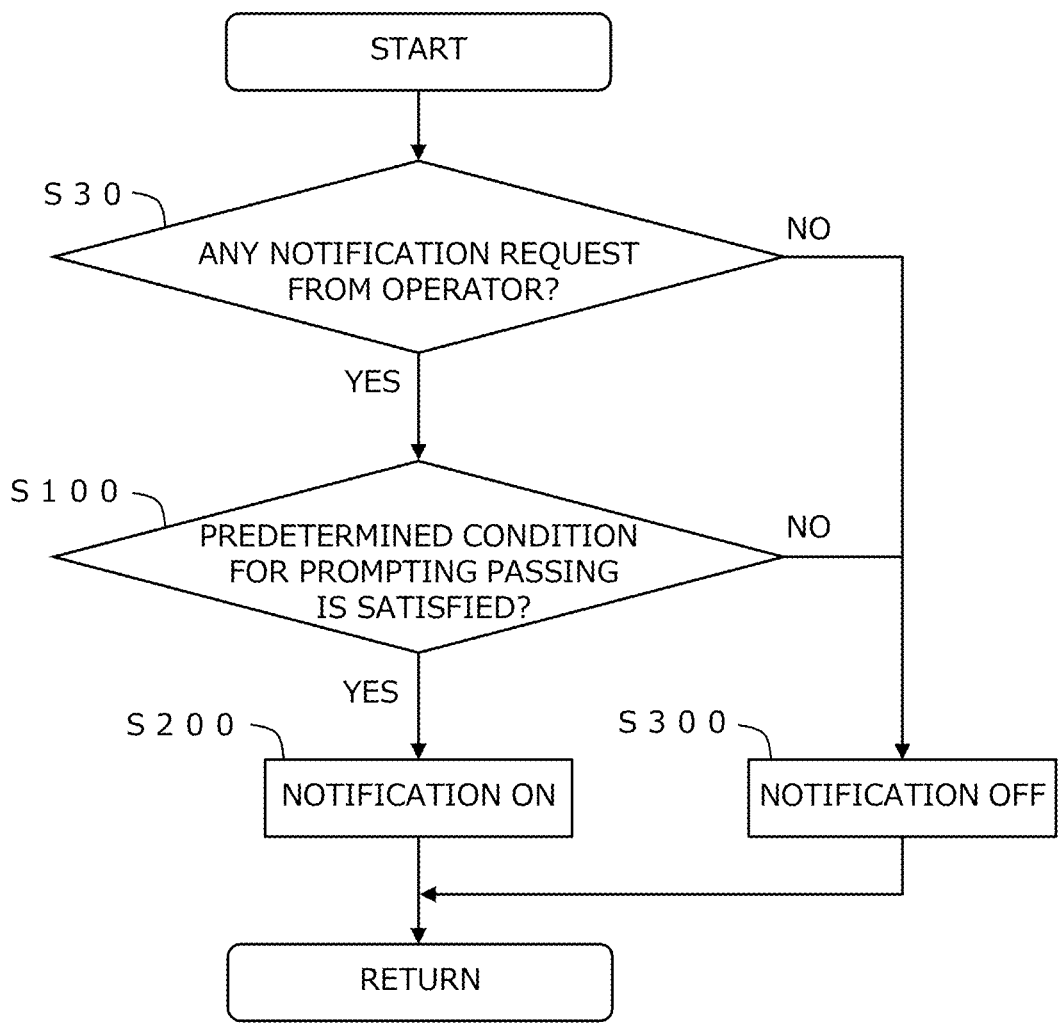
FIG. 16 is a flowchart illustrating a process related to a notification process performed when requested by an operator.

FIG. 16 is a flowchart illustrating a process related to the notification process performed when requested by the operator.

In Step S30, the control device 100 determines whether a notification request has been received from the operator of the vehicle 1. When a notification request has been received from the operator (Step S30: YES), the process proceeds to Step S100. Otherwise (Step S30: NO), the process proceeds to Step S300 (S100: NO).

In Step S100, the control device 100 determines whether the predetermined condition for prompting passing is satisfied based on the driving environment information 200 indicating the driving environment for the vehicle 1. Step S100 is similar to that described in Section 3 above. Thus, the detailed description thereof is omitted. When the predetermined condition is satisfied (Step S100: YES), the process proceeds to Step S200. Meanwhile, when the predetermined condition is not satisfied (Step S100: NO), the process proceeds to Step S300.

In Step S200, the control device 100 issues a passing prompting notification to rearward of the vehicle 1 (notification ON).

In Step S300, the control device 100 prohibit the issuance of the passing prompting notification (notification OFF). That is, when the predetermined condition is not satisfied, the control device 100 prohibit the issuance of the passing prompting notification even when a notification request has been received from the operator.

In this manner, it is also possible to appropriately issue a passing prompting notification even when a notification request is received from the operator of the vehicle 1.

6. Combination of Notification Processes

The notification processes described in Sections 3 to 5 above may be combined with one another.

7. Notification Process During Transition Period

Figure 17:
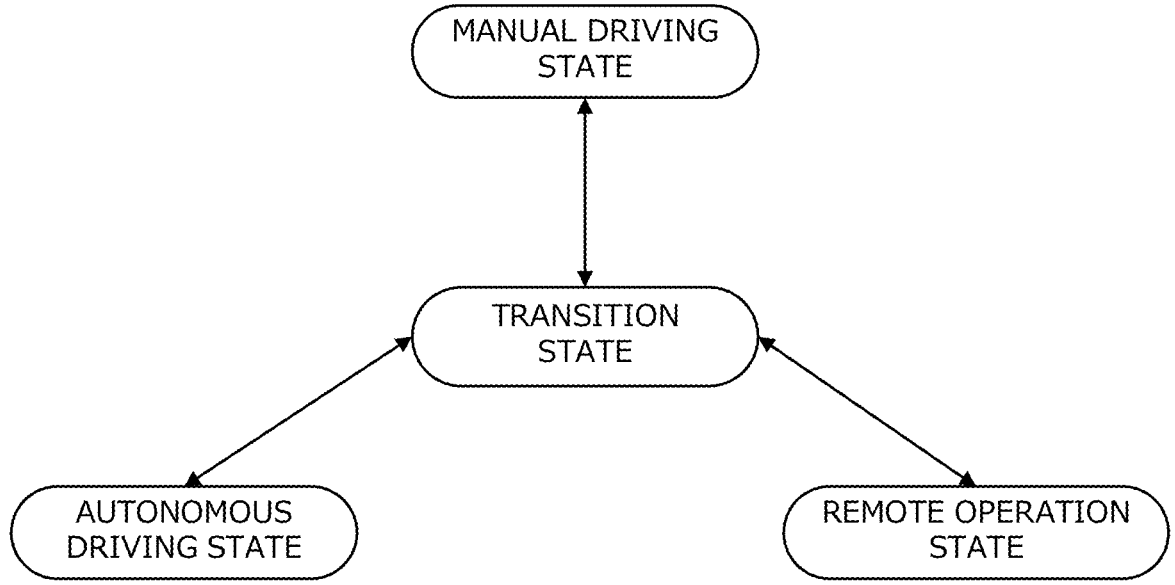
FIG. 17 is a conceptual view for illustrating various driving states of a vehicle.

FIG. 17 is a conceptual view for illustrating various driving states of the vehicle 1. The driving state of the vehicle 1 may switch among the manual driving state, the autonomous driving state, and the remote operation state. The transition state is a state in which the driving state of the vehicle 1 is switching. The transition period is a period in which the driving state of the vehicle 1 is switching. In the transition state (or the transition period), the control device 100 may issue a passing prompting notification to rearward of the vehicle 1.

Figure 18:
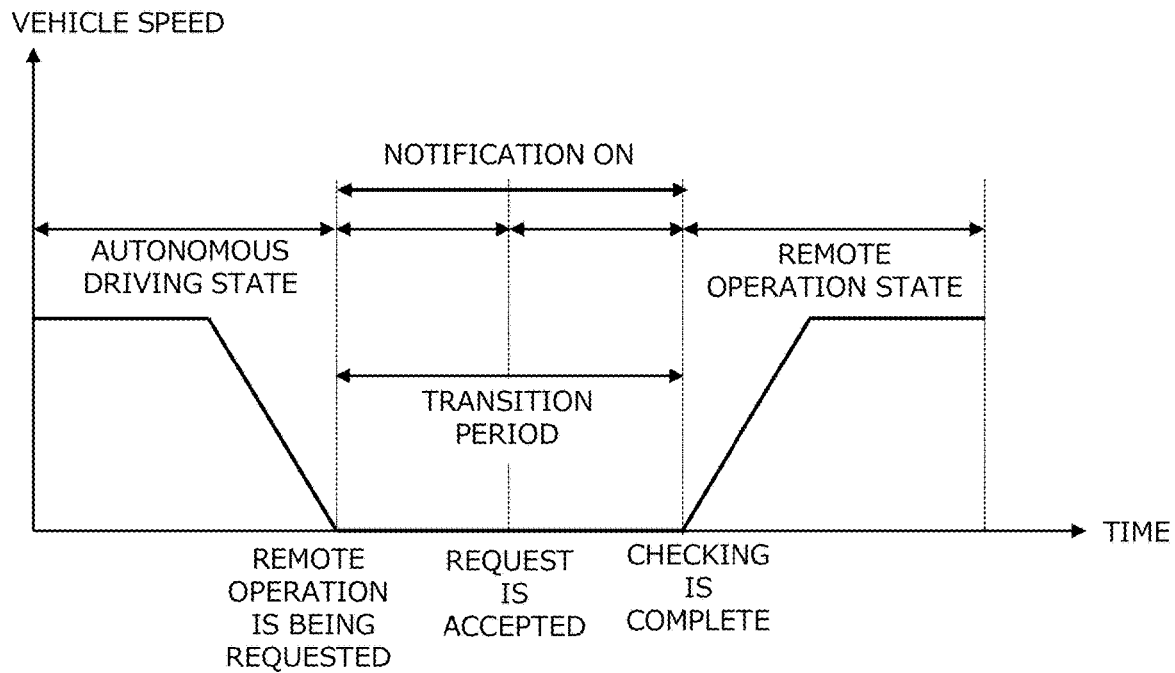
FIG. 18 is a timing chart illustrating an example of a notification process performed during the transition from the autonomous driving state to the remote operation state.

FIG. 18 is a timing chart illustrating an example of a notification process performed during the transition from the autonomous driving state to the remote operation state. The horizontal axis represents the time, and the vertical axis represents the speed of the vehicle 1. During the autonomous driving of the vehicle 1, the control device 100 transmits a remote operation request to the remote operator terminal 400 in response to a predetermined trigger. For example, in a circumstance where the autonomous driving of the vehicle 1 is difficult to continue, the control device 100 transmits a remote operation request to the remote operator terminal 400. When requesting a remote operation, the control device 100 causes the vehicle 1 to stop on the shoulder of the road, for example. The remote operator accepts the remote operation request. The remote operator and the remote operator terminal 400 prepare and check the remote operation. When checking is complete, the remote operator starts the remote operation of the vehicle 1. For example, a period from when the remote operation request is transmitted to when the remote operation is started corresponds to the transition period from the autonomous driving state to the remote operation state. In the transition period, the control device 100 issues a passing prompting notification to rearward of the vehicle 1.

Figure 19:
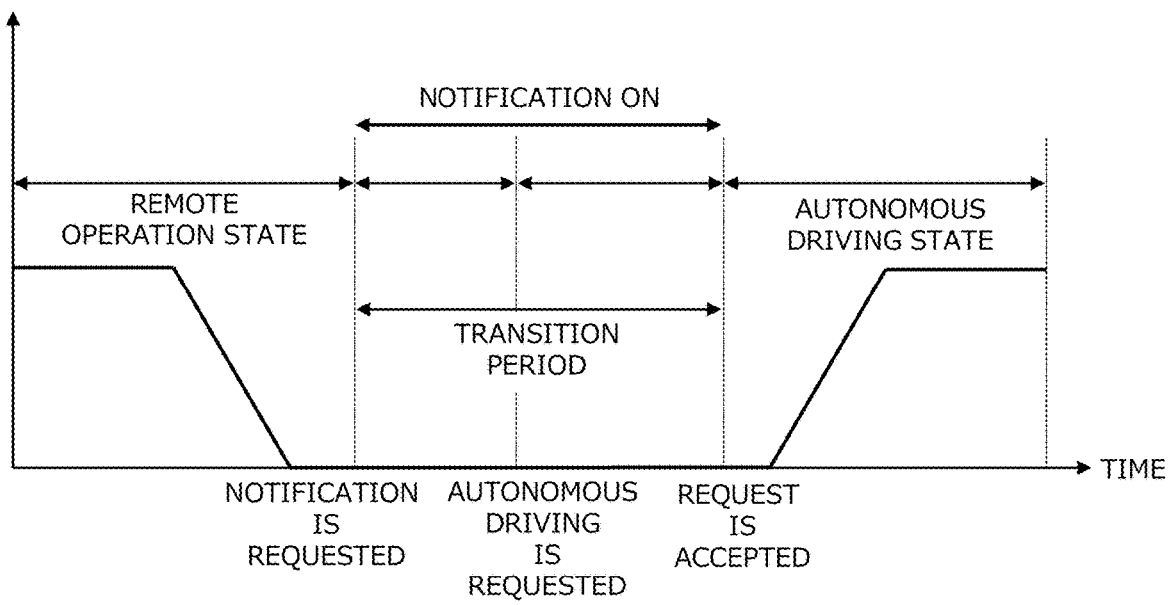
FIG. 19 is a timing chart illustrating an example of a notification process performed during the transition from the remote operation state to the autonomous driving state.

FIG. 19 is a timing chart illustrating an example of a notification process performed during the transition from the remote operation state to the autonomous driving state. The horizontal axis represents the time, and the vertical axis represents the speed of the vehicle 1. The remote operator causes the vehicle 1 to stop upon determining that the autonomous driving can be resumed. In addition, the remote operator requests the issuance of a passing prompting notification (notification request). Further, the remote operator requests the vehicle control system 10 to resume the autonomous driving. The control device 100 determines whether the autonomous driving can be resumed based on the driving environment information 200. When the control device 100 has determined that the autonomous driving can be resumed, the vehicle control system 10 accepts the autonomous driving request. Then, the vehicle control system 10 resumes the autonomous driving. For example, a period from when the notification request is received to when the autonomous driving request is accepted corresponds to the transition period from the remote operation state to the autonomous driving state. In the transition period, the control device 100 issues a passing prompting notification to rearward of the vehicle 1.

As a modified example, the control device 100 may determine whether the foregoing predetermined condition is satisfied in the transition period. When the predetermined condition is satisfied in the transition period, the control device 100 issues a passing prompting notification to rearward of the vehicle 1. On the other hand, when the predetermined condition is not satisfied in the transition period, the control device 100 prohibit the issuance of the passing prompting notification. Accordingly, a passing prompting notification can be issued more appropriately in the transition period.

What is claimed is:

1. A moving body control system for controlling a moving body, the moving body control system comprising one or more processors configured to:
   control the moving body to travel along a roadway during an execution of a remote operation of the moving body;
   control one or more sensors of the moving body to sense driving environment information indicating a driving environment for the moving body during the execution of the remote operation of the moving body and, during the execution of the remote operation, determine whether a predetermined condition is satisfied based on the driving environment information;
   based on determining that the predetermined condition is satisfied, control the moving body to maintain a speed of the moving body and issue a notification to rearward of the moving body, the notification prompting to pass the moving body and representing that passing the moving body is being legally permitted and with safety ensured;
   based on determining that the predetermined condition is not satisfied, control the moving body to maintain a speed of the moving body and prohibit issuance of the notification as lacking at least one of being legally permitted and with safety ensured; and
   control the moving body to travel along the roadway during an execution of an autonomous driving state of the moving body and, during the execution of the autonomous driving state of the moving body, control the moving body to stop on a shoulder of the roadway, issue the notification from a first time to a second time, the first time being one of when the moving body is stopped on the shoulder and a combination of the moving body being stopped on the shoulder and requesting the remote operation, and the second time being one of when the moving body accepts the remote operation and the moving body is controlled to resume travel on the road by the remote operation, wherein
   the predetermined condition includes at least:
      a first condition that the moving body is in an environment where passing is legally permitted; and
      a second condition that safety when the moving body is passed is ensured.

2. The moving body control system according to claim 1, wherein
   the first condition includes that a current position of the moving body is outside a non-passing zone.

3. The moving body control system according to claim 2, wherein the one or more processors are configured to:
   obtain information on a type of a center line of a road on which the moving body is traveling based on the driving environment information; and
   determine whether the first condition is satisfied based on the type of the center line.

4. The moving body control system according to claim 1, wherein
   the second condition includes that there is no oncoming moving body traveling in a first range of an oncoming lane, the first range including a region on a side of the moving body and a region diagonally ahead of the moving body.

5. The moving body control system according to claim 1, wherein
   the second condition includes that a space for a following moving body to pass the moving body is secured.

6. The moving body control system according to claim 1, wherein
   the predetermined condition further includes a third condition that a following moving body is present within a given range behind the moving body.

7. The moving body control system according to claim 6, wherein
   the predetermined condition further includes that a state in which a distance between the moving body and the following moving body is less than or equal to a threshold continues for a given period of time.

8. The moving body control system according to claim 1, wherein the one or more processors are further configured to:
   receive, during the execution of the remote operation of the moving body, a request from a remote operator of the remote operation to issue the notification to rearward of the moving body; and
   in response to the request and based on determining that the predetermined condition is not satisfied, prohibit the issuance of the notification to rearward of the moving body.

9. The moving body control system according to claim 1, wherein
   the one or more processors are further configured to issue the notification to rearward of the moving body in a transition period from autonomous driving of the moving body to the remote operation, the transition period being from the time at which the moving body is stopped on the shoulder to the time at which the moving body is controlled to resume travel on the road by the remote operation.

10. The moving body control system according to claim 1, wherein the one or more sensors comprise a one or more of any of a camera, a laser imaging detection and ranging (LIDAR), a radar, a speed sensor, an acceleration sensor, a yaw-rate sensor, a rudder angle sensor, and a global position system (GPS) sensor.

11. The moving body control system according to claim 1, wherein
   the first condition that the moving body is in the environment where passing is legally permitted comprises determining and comparing a distance from the moving body to a crossing of the roadway to a legal threshold at which vehicles are permitted to pass or not relative to the crossing, the crossing being at least one of an intersection, a railroad crossing, a bicycle crossing, and a pedestrian crossing.

12. The moving body control system according to claim 1, wherein the notification is a vehicle-to-vehicle (V2V) communication.

13. A moving body control method for controlling a moving body, the moving body control method comprising:
   controlling the moving body to travel along a roadway during an execution of a remote operation of the moving body;
   controlling one or more sensors of the moving body to sense driving environment information indicating a driving environment for the moving body during the execution of the remote operation of the moving body and, during the execution of the remote operation, determining whether a predetermined condition is satisfied based on the driving environment information;

based on determining that the predetermined condition is satisfied, controlling the moving body to maintain a speed of the moving body and issuing a notification to rearward of the moving body, the notification prompting to pass the moving body and representing that passing the moving body is legally permitted and with safety ensured, the speed of the moving body being below a speed limit as the moving body travels along the roadway during the execution of the remote operation;

based on determining that the predetermined condition is not satisfied, controlling the moving body to maintain the speed of the moving body and prohibiting issuance of the notification as lacking at least one of being legally permitted and with safety ensured; and controlling the moving body to travel along the roadway during an execution of an autonomous driving state of the moving body and, during the execution of the autonomous driving state of the moving body, controlling the moving body to stop on a shoulder of the roadway, issue the notification from a first time to a second time, the first time being one of when the moving body is stopped on the shoulder and a combination of the moving body being stopped on the shoulder and requesting the remote operation, and the second time being one of when the moving body accepts the remote operation and the moving body is controlled to resume travel on the road by the remote operation, wherein the predetermined condition includes at least:
  a first condition that the moving body is in an environment where passing is legally permitted; and
  a second condition that safety when the moving body is passed is ensured.

14. A non-transitory computer-readable recording medium storing a moving body control program for controlling a moving body, the moving body control program, when executed by a computer, causing the computer to execute:

controlling the moving body to travel along a roadway during an execution of a remote operation of the moving body;

controlling one or more sensors of the moving body to sense driving environment information indicating a driving environment for the moving body during the execution of the remote operation of the moving body and, during the execution of the remote operation, determining whether a predetermined condition is satisfied based on the driving environment information;

based on determining that the predetermined condition is satisfied, controlling the moving body to maintain a speed of the moving body and issuing a notification to rearward of the moving body, the notification prompting to pass the moving body and representing that passing the moving body is legally permitted and with safety ensured, the speed of the moving body being below a speed limit as the moving body travels along the roadway during the execution of the remote operation;

based on determining that the predetermined condition is not satisfied, controlling the moving body to maintain the speed of the moving body and prohibiting issuance of the notification as lacking at least one of being legally permitted and with safety ensured; and controlling the moving body to travel along the roadway during an execution of an autonomous driving state of the moving body and, during the execution of the autonomous driving state of the moving body, controlling the moving body to stop on a shoulder of the roadway, issue the notification from a first time to a second time, the first time being one of when the moving body is stopped on the shoulder and a combination of the moving body being stopped on the shoulder and requesting the remote operation, and the second time being one of when the moving body accepts the remote operation and the moving body is controlled to resume travel on the road by the remote operation, wherein the predetermined condition includes at least:
  a first condition that the moving body is in an environment where passing is legally permitted; and
  a second condition that safety when the moving body is passed is ensured.

* * * * *